(12) United States Patent
Heiser et al.

(10) Patent No.: US 12,307,475 B2
(45) Date of Patent: *May 20, 2025

(54) CONSUMER-SPECIFIC ADVERTISEMENT PRESENTATION AND OFFER LIBRARY

(71) Applicant: Segmint, Inc., Cuyahoga Falls, OH (US)

(72) Inventors: Russel Robert Heiser, Cuyahoga Falls, OH (US); Nathan W. Shahan, Cuyahoga Falls, OH (US)

(73) Assignee: SEGMINT INC., Plano, TX (US)

(*) Notice: Subject to any disclaimer, the term of this patent is extended or adjusted under 35 U.S.C. 154(b) by 1239 days.

This patent is subject to a terminal disclaimer.

(21) Appl. No.: 16/785,679

(22) Filed: Feb. 10, 2020

(65) Prior Publication Data

US 2020/0175541 A1    Jun. 4, 2020

Related U.S. Application Data

(63) Continuation of application No. 13/104,301, filed on May 10, 2011, now Pat. No. 10,558,994, which is a
(Continued)

(51) Int. Cl.
G06Q 30/0207    (2023.01)
G06F 16/9535    (2019.01)

(52) U.S. Cl.
CPC ..... G06Q 30/0224 (2013.01); G06F 16/9535 (2019.01)

(58) Field of Classification Search
CPC .................. G06Q 30/0224; G06F 16/9535
See application file for complete search history.

(56) References Cited

U.S. PATENT DOCUMENTS

| 5,319,542 A | 6/1994 | King, Jr. et al. |
| 5,442,771 A | 8/1995 | Filepp et al. |

(Continued)

FOREIGN PATENT DOCUMENTS

| CN | 1737842 A | 2/2006 |
| CN | 101536024 A | 9/2009 |

(Continued)

OTHER PUBLICATIONS

"HTTP cookie", http://en.wikipedia.org/wiki/HTTP cookie, 10 pgs., accessed Jul. 29, 2008.
(Continued)

*Primary Examiner* — David J Stoltenberg
*Assistant Examiner* — Kyle G Robinson
(74) *Attorney, Agent, or Firm* — KLEMCHUK PLLC

(57) ABSTRACT

Systems and methods are described for presenting targeted offer advertisements to qualified customers while browsing the Internet. A designated interaction region such as a frame or border is positioned on each advertisement, and when a customer activates the border by clicking on or hovering a cursor there over, a menu of selectable options is displayed, from which the customer may select to perform an action on the offer. For instance, the customer may select an option to save the targeted offer to an offer library for later review. Additionally, the customer may select an option to access the offer library to review details of saved offers.

10 Claims, 20 Drawing Sheets

Related U.S. Application Data continuation-in-part of application No. 11/865,466, filed on Oct. 1, 2007, now Pat. No. 11,250,474.

(60) Provisional application No. 61/332,930, filed on May 10, 2010, provisional application No. 60/849,156, filed on Oct. 2, 2006.

(56) References Cited

U.S. PATENT DOCUMENTS

| | | |
|---|---|---|
| 5,446,891 A | 8/1995 | Kaplan et al. |
| 5,642,485 A | 6/1997 | Deaton et al. |
| 5,644,723 A | 7/1997 | Deaton et al. |
| 5,649,114 A | 7/1997 | Deaton et al. |
| 5,687,322 A | 11/1997 | Deaton et al. |
| 5,796,967 A | 8/1998 | Filepp et al. |
| 5,961,593 A | 10/1999 | Gabber et al. |
| 6,055,510 A | 4/2000 | Henrick et al. |
| 6,064,380 A * | 5/2000 | Swenson ............... G06F 16/40 725/87 |
| 6,073,140 A | 6/2000 | Morgan et al. |
| 6,128,663 A | 10/2000 | Thomas |
| 6,216,129 B1 | 4/2001 | Eldering |
| 6,236,975 B1 | 5/2001 | Boe et al. |
| 6,266,649 B1 | 7/2001 | Linden et al. |
| 6,317,722 B1 | 11/2001 | Jacobi et al. |
| 6,330,543 B1 | 12/2001 | Kepecs |
| 6,401,075 B1 | 6/2002 | Mason et al. |
| 6,424,949 B1 | 7/2002 | Deaton et al. |
| 6,519,571 B1 | 2/2003 | Guheen et al. |
| 6,523,041 B1 | 2/2003 | Morgan et al. |
| 6,560,578 B2 | 5/2003 | Eldering |
| 6,684,195 B1 | 1/2004 | Deaton et al. |
| 6,766,327 B2 | 7/2004 | Morgan, Jr. et al. |
| 7,062,510 B1 | 6/2006 | Eldering |
| 7,072,849 B1 | 7/2006 | Filepp et al. |
| 7,213,032 B2 | 5/2007 | Mascarenha |
| 7,886,226 B1 | 2/2011 | McCoy et al. |
| 7,930,252 B2 | 4/2011 | Bender et al. |
| 2001/0034651 A1 | 10/2001 | Marks et al. |
| 2001/0049620 A1 | 12/2001 | Blasko |
| 2002/0003162 A1 | 1/2002 | Ferber et al. |
| 2002/0019764 A1 | 2/2002 | Mascarenhas |
| 2002/0026345 A1 | 2/2002 | Juels |
| 2002/0046341 A1 | 4/2002 | Kazaks et al. |
| 2002/0072975 A1 | 6/2002 | Steele et al. |
| 2002/0088001 A1 | 7/2002 | Zustak et al. |
| 2002/0099605 A1 | 7/2002 | Weitzman et al. |
| 2002/0111863 A1 | 8/2002 | Landesmann |
| 2002/0188507 A1 | 12/2002 | Busche |
| 2002/0194058 A1 | 12/2002 | Eldering |
| 2003/0033199 A1 | 2/2003 | Coleman |
| 2003/0036979 A1 | 2/2003 | Tokorotani |
| 2003/0163373 A1 | 8/2003 | Cornateanu |
| 2003/0168510 A1 | 9/2003 | Allen |
| 2003/0222134 A1 | 12/2003 | Boyd |
| 2003/0225614 A1 | 12/2003 | Rodriguez et al. |
| 2004/0044627 A1 | 3/2004 | Russell et al. |
| 2004/0049419 A1 | 3/2004 | Knight |
| 2004/0078604 A1* | 4/2004 | Rice ..................... H04L 63/168 726/5 |
| 2004/0102980 A1* | 5/2004 | Reed ....................... G06Q 30/02 705/1.1 |
| 2004/0172343 A1 | 9/2004 | Allibhoy et al. |
| 2004/0225609 A1 | 11/2004 | Greene |
| 2004/0230593 A1 | 11/2004 | Rudin et al. |
| 2004/0249712 A1 | 12/2004 | Brown et al. |
| 2004/0267611 A1 | 12/2004 | Hoerenz |
| 2005/0028188 A1 | 2/2005 | Atona et al. |
| 2005/0038699 A1 | 2/2005 | Lillibridge et al. |
| 2005/0060227 A1 | 3/2005 | Nelson |
| 2005/0114206 A1 | 5/2005 | Bennett et al. |
| 2005/0131758 A1 | 6/2005 | Desikan et al. |
| 2005/0192863 A1* | 9/2005 | Mohan .................. G06Q 30/02 705/14.27 |
| 2005/0246736 A1 | 11/2005 | Beyda et al. |
| 2005/0251445 A1 | 11/2005 | Wong et al. |
| 2006/0004628 A1 | 1/2006 | Axe et al. |
| 2006/0074769 A1 | 4/2006 | Looney et al. |
| 2006/0080238 A1 | 4/2006 | Nielsen et al. |
| 2006/0136294 A1 | 6/2006 | Linden et al. |
| 2006/0161599 A1 | 7/2006 | Rosen |
| 2006/0178935 A1 | 8/2006 | Barton et al. |
| 2006/0178986 A1 | 8/2006 | Giordano et al. |
| 2006/0242013 A1 | 10/2006 | Agarwal et al. |
| 2006/0253453 A1* | 11/2006 | Chmaytelli ........ G06Q 30/0601 |
| 2006/0287919 A1 | 12/2006 | Rubens et al. |
| 2007/0033106 A1 | 2/2007 | Mason |
| 2007/0038516 A1 | 2/2007 | Apple et al. |
| 2007/0067267 A1 | 3/2007 | Ives |
| 2007/0067297 A1 | 3/2007 | Kublickis |
| 2007/0124425 A1 | 5/2007 | Gross |
| 2007/0239556 A1 | 10/2007 | Wagner |
| 2007/0244809 A1 | 10/2007 | Meeks |
| 2007/0260508 A1 | 11/2007 | Barry et al. |
| 2007/0299728 A1 | 12/2007 | Nemirofsky et al. |
| 2008/0004884 A1 | 1/2008 | Flake et al. |
| 2008/0005313 A1 | 1/2008 | Flake et al. |
| 2008/0010206 A1 | 1/2008 | Coleman |
| 2008/0046314 A1 | 2/2008 | Chung et al. |
| 2008/0086365 A1 | 4/2008 | Zollino et al. |
| 2008/0091535 A1 | 4/2008 | Heiser et al. |
| 2008/0250450 A1 | 10/2008 | Larner et al. |
| 2008/0290987 A1 | 11/2008 | Li |
| 2009/0007012 A1 | 1/2009 | Mandic et al. |
| 2009/0150238 A1 | 6/2009 | Marsh et al. |
| 2009/0327073 A1 | 12/2009 | Li |
| 2010/0088170 A1 | 4/2010 | Glore, Jr. |
| 2010/0106596 A1 | 4/2010 | Grimes |
| 2010/0106598 A1 | 4/2010 | Grimes |
| 2011/0208575 A1* | 8/2011 | Bansal .................. G06Q 30/02 709/248 |

FOREIGN PATENT DOCUMENTS

| | | |
|---|---|---|
| EP | 0 991 006 A2 | 4/2000 |
| WO | 2009134432 A1 | 11/2009 |

OTHER PUBLICATIONS

"How Mint Personal Finance Management Protects Your Financial Safety—Financial . . . ", http://www.mint.com/safe.html. 2 pgs., accessed Jul. 31, 2008.

Hellauer, Brian, "Banks Take Aim at Target Marketing" XP-001130643; Midcon Conference Record, Ventura, CA, US, Feb. 1, 1993 (Feb. 1, 1993), 6 pages.

Office Action of corresponding CN Patent App. No. 200780038397. 1, dated Mar. 24, 2015, 6 pages.

Notice of Allowance for corresponding CN Patent App. No. 200780038397.1, dated Jul. 13, 2006, 4 pages.

Office Action of corresponding IN Patent App. No. 9546/CHENP/ 2012, dated Nov. 13, 2019, 8 pages.

* cited by examiner

FIG. 18

CONSUMER-SPECIFIC ADVERTISEMENT PRESENTATION AND OFFER LIBRARY

CROSS-REFERENCE TO RELATED APPLICATIONS

This application is a continuation of U.S. patent application Ser. No. 13/104,301 filed on May 10, 2011, which claims priority to U.S. Provisional Application Ser. No. 61/332,930, filed on May 10, 2010. U.S. patent application Ser. No. 13/104,301 is also a continuation-in-part (CIP) of, and claims priority to, U.S. patent application Ser. No. 11/865,466 filed on Oct. 1, 2007 and entitled Personalized Consumer Advertising Placement, which claims priority to U.S. Provisional Patent Application Ser. No. 60/849,156 filed on Oct. 2, 2006 and entitled Personalized Consumer Advertising Placement. The foregoing applications are incorporated by reference herein in their entireties.

BACKGROUND

The subject application relates to targeted advertising systems and methods. While the systems and methods described herein relate to targeted advertising and the like, it will be appreciated that the described techniques may find application in other advertising systems, other advertising pricing applications, and/or other advertisement placement and pricing methods.

Advertisers are constantly searching for more efficient means to allow their products/services to be advertised to consumers who have a need for their products/services or who are currently spending money on similar products/services with a competitor. In essence, advertisers are constantly faced with finding the consumer who is "ready" to purchase their products/services, "able" to complete the purchase of their products/services, and "willing" to purchase the products/services immediately ("RAW"). With the advent of newer technologies such as Digital Video Recorders (DVRs) and On Demand TV, advertisers fear the loss of traditional means of advertising to consumers.

Current options for electronic web based advertising are very costly and yield limited results. To reach an acceptable number of consumers to advertise their products/services advertisers must run campaigns, which reach masses of people but only yield single digit return in consumer interest and purchases. For example out of 100 consumers who see an advertiser's campaign/ad, only 3-5 may be RAW. Despite their best efforts, current consumer advertising methods remain very costly and yield a minimal return for the amount of investment.

One problem with present online advertising is called a shotgun approach. In this approach, an advertiser/marketer buys a word that is typed into an internet search engine. When purchasing this word or phrase the marketer/advertiser is thinking, "based on this word I think that xx % might be interested in my product". The problem is those words are very expensive. Internet advertisers are getting market rates such as between $5.00 and $10.00 per word per click to have a good placement on a web site per a single word or two word phrase. Moreover, the marketer/advertiser does not know whether the consumer who views their advertisement is RAW.

Marketers have been able to develop ways to maintain customers once they have initiated purchases via tracking of the consumers purchasing habits and trends. Special loyalty programs have been developed such as reward coupons and other incentives based on the amount, frequency, and trends of the consumers purchases. Other advertisers/on-line retailers such as Amazon.com profile the customers who actually visit their site. With Amazon, the consumer is profiled by the products they view and what they purchase while on the site. Amazon then tracks the consumer's habits of shopping and what they purchased so that when the consumer signs in at another time advertisements will immediately pop up with "suggested items" for the consumer to consider purchasing based on their previous actions and purchases with Amazon only. While these approaches are effective in maintaining already existing customers and motivating the consumer to purchase additional items, they fall short in their ability to secure additional customers from competitors who offer similar products/services. The current advertising methodologies are still unable to track actual consumer spending and trends outside of an already existing customer, i.e. based on a broad spectrum of actual financial transactions within the consumer's financial institution(s).

To make their advertising dollars more effective, advertisers attempt to target their advertising to individuals who are more likely to have an interest in the advertised product, thereby producing a higher click-through rate and increased revenues. Of course, in order to target individuals with any degree of accuracy, something must be known about the individual. For this reason, technologies have been developed for what is known in the art as behavioral targeting based on tracking a user's habits through monitoring of the websites that the user visits, and offering targeted advertising based on the content of the visited websites. It is assumed, for example, that if a user is visiting automobile oriented websites, then an automobile oriented advertisement is more likely to generate a user response than one for breakfast cereal. A problem with this type of website tracking is that if an automobile advertisement for a very expensive car is delivered to a user and he cannot afford to purchase the automobile, then the advertisement is not very effective.

There is a need for a personalized advertising architecture/solution, which facilitates permitting a user to view targeted offers, select store target offers for later review, and recall a library of targeted offers for later review and/or acceptance.

SUMMARY

Consumers are identified with their actual consumer financial expenditures so that they can be mined and sorted within a database according to specific advertising/ad criteria provided by marketers, advertisers, ad agencies, and other applicable organizations to match a desired consumer profile with consumers of such a profile. The subject personalized consumer advertising/ad placement system provides the ability for marketers, advertisers, ad agencies, and any other applicable organization to determine and electronically present their "ideal" consumer profile, or market segment, and have their advertisement/promotion placed in front of all consumers who match the profile based on the mining of the consumers actual spending across a broad base of financial transactions and other non-personal information. The ability to allow any advertisers/ad agencies regardless of business or specific merchant focus, the ability to "create" a "custom" profile for specific consumers within a certain market, within a geographical location, with a certain monthly income from the consumer's actual financial transactions within their financial institution(s) would be advantageous and unique compared to any technologies on the market today.

By way of introduction only, a personalized consumer advertising/ad architecture/solution may include the presentation of personal and targeted advertisements/promotions prepared by an advertiser, ad agency, or any other applicable organization, transferred electronically to a web site entered by the consumer for electronic review and response.

An embodiment of the personalized consumer advertising/ad architecture/solution enables non-personal consumer transaction data to be transferred electronically from any financial institution to an advertisement delivery provider's database. This financial data can consist of checking account transactions, credit card transactions, and loan information as well as any other purchase or financial transactions that may pertain.

The advertisement delivery provider will house all transactional data in its secure, industry compliant database (software and hardware). Each set of consumer transactions will be provided a key number by the financial institution as the data is passed to the advertisement deliver provider's database. This key number will be maintained by the financial institution to enable the mined data with the corresponding ads/promotions from the advertisers to be married back together with the consumer for placement on the consumer's computer after mining.

The advertisement delivery providers will interact with outside marketers, advertisers, ad agencies and other applicable organizations to secure their individual consumer advertising profiles for specific products/services to be advertised to consumers. The marketer, advertiser, ad agency, or other organizations will be able to provide the exact target consumer they would like to view their ad/promotion. An example might be a home improvement store which might establish a profile with the advertisement delivery providers to place a specific ad/promotion in front of all consumers within 20 miles of Cleveland, having spent over $500 in the past 6 months on home improvements, who engages in transactions with Lowes, Sears, Ace Hardware, and TrueValue, and who have a total income of over $8,000 per month. The advertisement delivery provider would then mine its database containing all of the financial transactions from multiple financial institutions only identifying those consumer accounts, which fit these specific criteria.

Pricing for the data mining provided by the advertisement delivery provider will vary based on the number of levels of segmentation the marketer, advertiser, ad agency, and other organizations may specify. The more targeted the consumer audience requested by an advertising organization, the more the cost to have the ad displayed will escalate. An example of costs would be the home improvement scenario used above. There were four levels of criteria specified and each level cost $1.00, thus the total cost would be $4.00 to the advertiser for every ad opened by the targeted consumer. Also, the pricing can be determined as whether an advertisement has simply been displayed, or whether an advertisement has been displayed and clicked.

Through the use of the personalized consumer advertising/ad architecture/solution, consumers will be able to see new promotions and ads every time they sign in to their on-line financial institution web account as well as when they surf to web sites not affiliated with a financial institution. Consumers can be flagged unobtrusively as they enter these sites as to how many new ads/promotions have been provided to them since their last sign in.

The advantage of the personalized consumer advertising/ad architecture/solution is that only ads/promotions appearing for the consumer can be for services/products they are currently spending their money on, or have an immediate interest in, across all categories of purchase. Consumers may receive ads/promotions, which have discounts at retail stores, restaurant coupons, special promotions and rebates on automobiles etc. to name a few of the types of ads/promotions.

A second advantage of the invention is the ability for the advertisement delivery provider to create an electronic bridge from the financial institution to the advertiser for the benefit of the consumer. The financial institution can now provide an additional service offering by placing ads, promotions, and coupons directly in front of a consumer for not only the things they have interest in but in addition are purchasing currently.

A third advantage is that the consumer remains anonymous to the advertiser, despite seemingly having a direct communication from the advertiser upon the consumer's signing on to the financial institution's web site. If the consumer chooses to ignore the advertisement (no click) then the advertisement may expire after a selected time-out or upon the completion of the advertising campaign.

According to one aspect, a method for storing targeted offers in an offer library for a customer during an online web browsing session comprises presenting a targeted offer to the customer on a web page being visited by the customer, and displaying a menu comprising a plurality of selectable options to the customer when the customer activates the menu, the options representing actions to be performed on the offer. The method further comprises receiving customer input relating to selection of an option for storing the offer in the offer library, and storing the offer to the offer library on a computer-readable medium upon receiving the customer input. The offer is targeted to the customer anonymously using an advertisement delivery identification code (ADIC) that describes the customer.

According to another aspect, a method of displaying targeted offers to qualified customers comprises defining a plurality of advertisement zones on a web page, characterizing each of the advertisement zones by defining one or more parameters of each advertising zone, and selecting an offer advertisement for each advertisement zone. The method further comprises placing the selected offer advertisements in respective characterized advertisement zones, and positioning an interactive border on each advertisement zone, the interactive border being selectable by a customer viewing the web page to activate a menu comprising selectable options for executing predefined actions on the offer advertisements in the advertisement zones.

According to another aspect, system for permitting a customer to store targeted offers to an online offer library, comprises a web page on which is displayed to the customer at least one offer targeted to the customer as a function of a customer profile associated with the customer; and a processor that executes stored instructions for presenting the offer to the customer on a web page being visited by the customer. The instructions further include displaying a menu comprising a plurality of selectable options to the customer when the customer activates the menu, the options representing actions to be performed on the offer, receiving customer input relating to selection of an option for storing the offer in the offer library, and storing the offer to the offer library on a computer-readable medium upon receiving the customer input. The system further comprises an interactive border region surrounding the offer, and a menu comprising a plurality of selectable options, the menu being activated when the customer interacts with the border region. The offer is targeted to the customer anonymously using an advertisement delivery identification code (ADIC) that describes the customer.

The foregoing summary is provided only by way of introduction. All features, benefits, and advantages of the personalized consumer advertising/ad architecture/solution may be realized and obtained by instrumentalities and combinations particularly pointed out in the claims. Nothing in this section should be taken as a limitation on the claims, which define the scope of the invention.

The subject development is also applicable to the other entities or financial institutions who maintain personalized web sites in association with customers' financial data, such as insurers, investment counselors, brokers or the like.

BRIEF DESCRIPTION OF THE FIGURES

FIG. 18 shows a screenshot of a webpage with examples of customer transactions that are analyzed to derive KLI tags for Customer.

DETAILED DESCRIPTION

Figure 1:
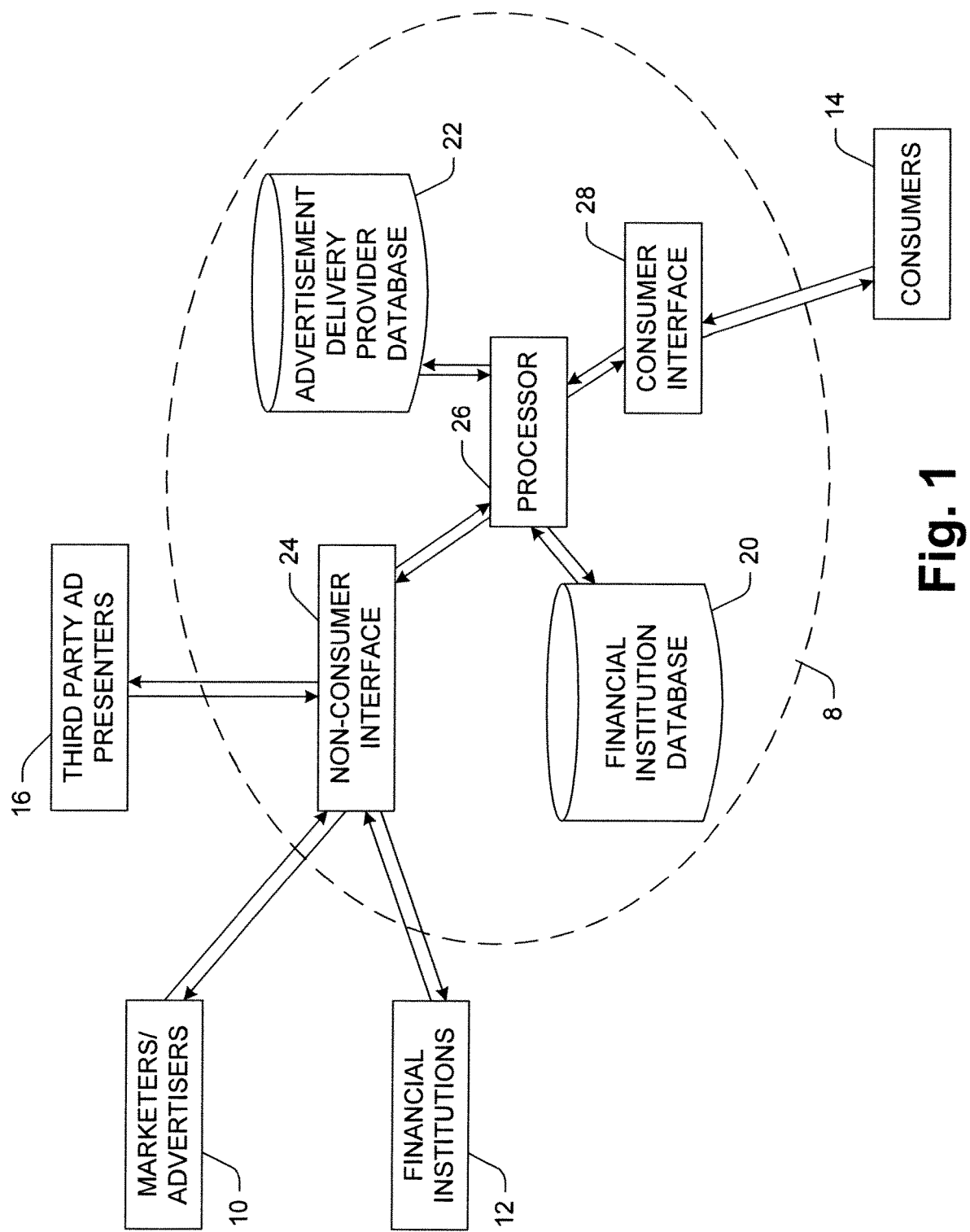
FIG. 1 is a block diagram depicting a system for selectively delivering advertisements.

The following is a description of a system and a method for delivering targeted advertisements to consumers over a network, such as the Internet or similar integrated network. An example of such a system will be described so that one can make the system; however, the embodiments, which are defined by the appended claims, are not limited to only the system described below. With reference to FIG. 1, the system 8 allows for communication among the following individuals or entities: marketers 10, financial institutions 12 and consumers 14. The system can also allow companies or entities that are not financial institutions to allow for the delivery of advertisements on their web sites or other communication platform—these entities will be referred to as third party advertisement presenters 16.

The marketers 10 are companies or individuals who wish to deliver an advertisement to the consumers 14. More particularly, the system allows marketers 10 to deliver advertisements to consumers who are ready, able and willing (RAW) to buy the products or services offered by the marketer. The consumers 14 are also customers of at least one of the financial institutions that share information within the system. The financial transactional history of the consumers, which is provided by the financial institutions, is used to define a market segment that will receive targeted advertisements over the network. The financial institutions 12 can include banks, savings and loans, credit unions, retailers and the like. The third party advertisement presenters 16 operate web sites that are not affiliated with the any of the financial institutions (or are unsecure web sites that are operated by the financial institutions) that allow for the delivery of advertisements. The system is designed to maintain the anonymity of the consumers while allowing the marketers to have their advertisements delivered to consumers who fall within their defined market segment.

Generally the system includes a secure database 20 (or a plurality of secure databases) that is/are operated by the financial institutions 12. The financial institution secure database 20 stores, or warehouses, the financial transactions (and other financial information) of the customers of the financial institution along with other non-financial information. These financial transactions can include the debits and credits of the customers of the bank, the loans that are held by the bank for that customer, credit/debit card transactions and the like. The other information about the customer that is stored in the financial information secure database 20 includes information such as the identity of the customer, the age and sex of the customer and the home zip code of the customer. This customer information is associated with a unique customer identification code (UCIC) that associates the customer to the information while still maintaining the anonymity of the customer. By anonymity is meant that the information communicated to the advertising delivery provider precludes the provider from knowing who the consumer really is so that the "cookie" presented to the consumer is anonymous. Accordingly, the UCIC can be referred to as an anonymous coding. For example, the UCIC is not based on the name, address or social security number of the customer, which could lead to the identity of the customer becoming known. The UCIC is tied to the financial transactions of the customer, the age and sex of the customer, and the zip code of the customer; however, more personal information, such as the social security number, phone number, credit card numbers and the name of the customer, is not associated with the UCIC, thus protecting the identity of the customer.

The system also includes a secure database 22 that is operated by advertisement delivery provider. This database 22 associates the UCIC with the information that is similar to that stored in the financial institutions databases. The advertisement delivery provider database 22 stores, or warehouses, the financial information and other non-personal information that it receives from a number of different financial institutions. The advertisement delivery provider database 22 also associates an advertisement delivery identification code (ADIC) and a financial institution identification code (FIIDC) for each individual customer stored in its database and associates these codes with the UCIC that is provided by the financial institution database. The ADIC is unique to each customer stored in the database. The FIIDC is associated with the financial institution that has the provided the customer information for the unique customer. Since the UCIC maintains the anonymity of the consumer to which it is matched, the ADIC and the FIIDC also maintain that anonymity of the consumer because no personal information is matched to these codes. Accordingly, the UCIC and the FIIDC can also be referred to as anonymous codings.

The system 8 also includes a first interface 24, or portal, which will be referred to as a non-consumer portal, that allows marketers 10, financial institutions 12 and third party advertisement presenters 16 to communicate with the advertisement delivery provider database through a processor 26, which runs system software and is operated by the advertisement delivery provider. The system further includes a second interface 28, which will be referred to as a consumer portal, through which consumers 14 will receive targeted advertisements based on non-personal information that is known about the individual consumer who has logged onto the consumer portal 28.

Generally, the method for delivering targeted advertisements to consumers includes a marketer 10 defining a market segment, a financial institution 12 providing a base of customers from which the market segment can be drawn, and an entity (the advertisement delivery provider) that delivers advertisements to consumers that are within the defined market segment. A market segment is group of people or entities that share one or more characteristics that cause them to have similar product needs. A method for delivering targeted advertisements to consumers will be described in detail so that one skilled in the art can practice the method; however, the order in which the steps of the method are practiced can deviate from the order in which they are depicted in the FIGURES.

Figure 2:
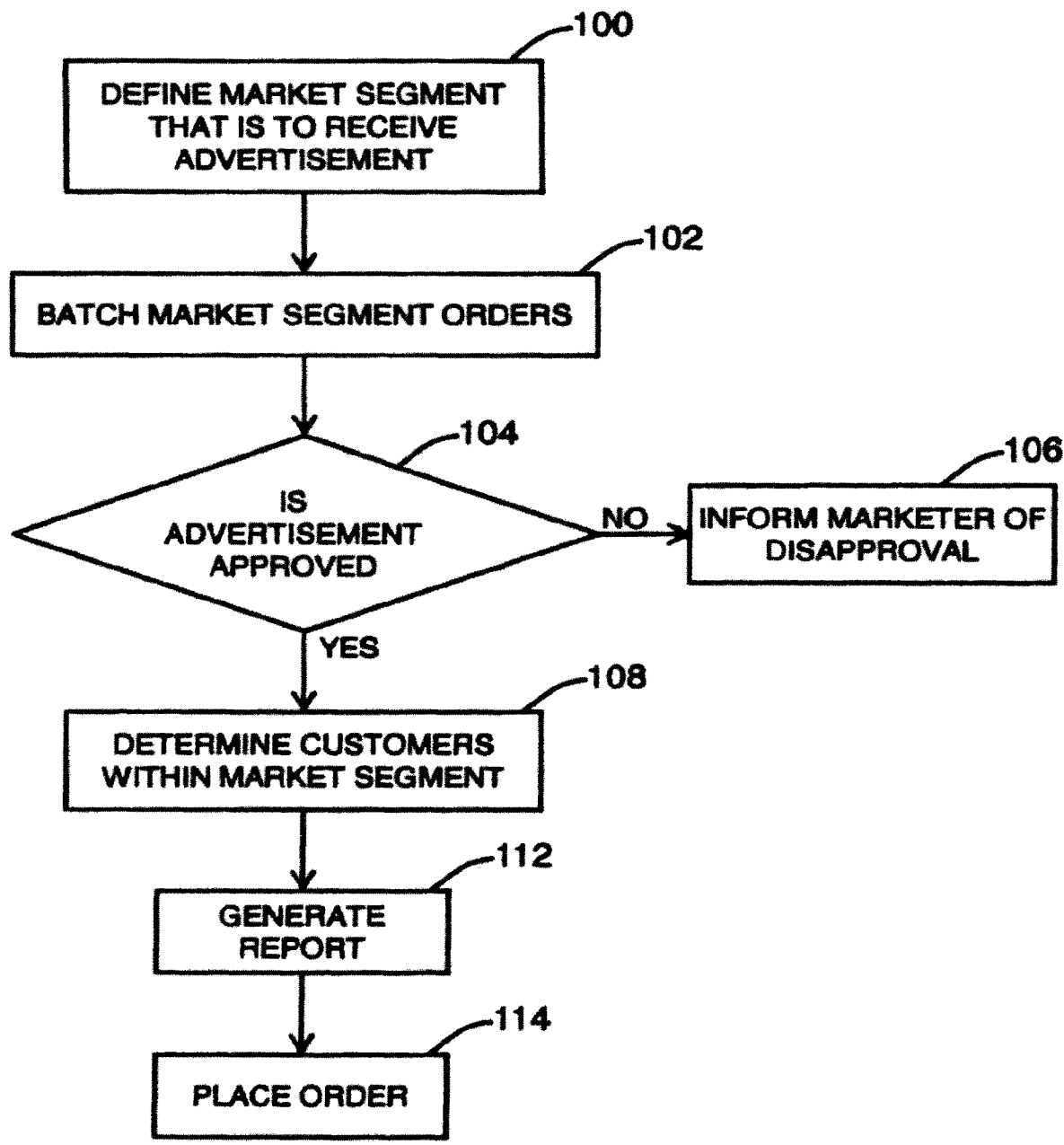
FIG. 2 is a flow diagram depicting a process for ordering an advertisement to be delivered to a consumer.

FIG. 2 depicts steps that can be carried out by the marketer to deliver targeted advertisements to consumers. The marketer is the entity that desires to sell a product or a service and therefore wishes to advertise its products or services. The marketer can also simply wish to deliver advertisements to a market segment and not be in the business of selling a product or service, e.g. a charitable organization. At 100 the marketer defines a market segment that is to receive an advertisement. Prior to defining the market segment, the marketer will typically have developed an advertisement that it would like to deliver to a consumer who is within the defined market segment. For example, a marketer desiring to sell sport cars may define the market segment to be females who have a monthly car payment of over $450. The market segment could be narrowed, for example to where a consumer lives, the number of car payments that the consumer may have left on a car loan or lease, the monthly deposits made into the consumer's checking or savings account and other information that may be relevant in determining whether the consumer is in the market for a sports car. As will be described with more detail with reference to FIGS. 3 and 4, the market segment can be defined solely by the marketer or the market segment can be defined with the aid of software utilized within system.

With continued reference to FIG. 1, at 100 the market segment is defined by the marketer filling out an order screen, which in the depicted system embodiment is a web portal (non-consumer portal 24 in FIG. 1) that is operating the software that facilitates defining the market segment. Financial institution customers that fall within the market segment comprise the group of consumers who will receive the targeted advertisement of the marketer, which in the example described above is an advertisement for a sports car.

At 102, market segment order data is batched with other market segment order data that has been received from other marketers or with market segment order data that has been received from the same marketer requesting advertisements be delivered to a different market segment. The market segment data is batched in the advertisement delivery provider database 22 (FIG. 1).

At 104, the site (or sites) that is/are to present the advertisement approves or disapproves of the advertisement(s) that are to be delivered on its site. Typically, the site where the advertisement is to be presented is the secure web site where the financial institution's customer performs transactions over the network (e.g. the financial institution's secure web site). Nevertheless, the site where the advertisement is to be delivered can also include unsecure web sites (e.g. cnn.com, espn.com and the like). If the advertisement is not approved, then at 106 the marketer is informed of this decision and can also be given the reason for the disapproval of the advertisement. More description of the process involved in approval of the advertisement is described at FIG. 4.

If the advertisement is approved by at least some of the operators of web sites that are to display the advertisements, than at 108, the order data is processed to determine the customers who fall within the market segment. The advertisement delivery provider database 22 (FIG. 1) is queried by the software on the processor 26, which may include the database 22, to locate customers that fall within the market segment. In this database, each consumer, who is also a customer of one of the financial institutions that is a part of the system, is associated with a financial institution identification code (FIIDC), a unique customer identification code (UCIC) and an advertisement delivery identification code (ADIC). As stated above, each customer in the advertisement delivery provider database is associated with a customer identification that is not traceable back to the customer. Only the financial transaction history, which has been provided by the financial institutions, and other non-identifying information (e.g., zip code, sex, age) is stored in the advertisement delivery provider database and associated with the FIIDC, the UCIC and the ADIC for each individual customer. The UCIC is merely an anonymous profile that does not contain any means to identify the customer, i.e.

name or social security number, other than the transactional financial history of the customer. Accordingly, the marketer is able to deliver an advertisement to a consumer who is ready, willing and able to purchase the good or service offered by the marketer; however, the identity of the consumer by the marketer and the advertisement delivery provider remains unknown.

The ADIC also designates the customer, however, this identification is assigned by the software of the system, which is operated by the advertisement deliver provider as opposed to by the financial institutions. The ADIC is most useful when the consumer logs onto a web site other than a secure web site operated by one of the financial institutions that is operating within the system. The ADIC provides an identification of the consumer that can be linked back to the UCIC and the financial information that is associated with the UCIC. When a consumer logs onto a secure financial institution's web site, which will be described in more detail below, the UCIC, which has been assigned by the financial institution, is already known because the financial institution knows the identity of its customer. However, the financial institution does not share the "true identity" (the "true identity" being an identifying characteristic that would allow the identity of the customer to be known to the advertisement deliver provider). Instead the financial institution only provides the UCIC to the advertisement delivery provider which as discussed above is not traceable back to the financial institution's customer's identity. Accordingly, the financial institution is providing a database of anonymous customers each having a different financial history. Thus only the financial transactions (and other non-identifying information) of the customer are known to the advertisement delivery provider.

At 108, the database is queried to determine which customers meet the criteria of the market segment to determine the expected success of the campaign. For the sports car example mentioned above, the database is queried to determine which consumers pay over $450 per month for a car. During processing, the expected campaign success and the time it will take the advertisement to meet a predetermined number of the consumers can also be reported to the marketer. For example, where the marketer defines the market segment very narrowly only a few consumers may meet the criteria and the likelihood for success of the advertising campaign is also low or will involve an unacceptable length of time before the number of targeted consumers will receive the advertisement. The number of consumers that meet the criteria of the segment can aid in determining how many consumers will receive the advertisement that is sent out. This will be described in more detail with reference to FIG. 6.

At 112 a report is generated that is sent to the marketer via the first portal 24 (FIG. 1). The report can include such information as the number of consumers in the market segment and the time it will take for a predetermined number of views of the advertisement. The time it will take to reach a predetermined amount of consumers can be determined by the amount of times on average consumers in that market segment log on to certain web sites that allow for the delivery of these targeted advertisements.

At 114, the marketer is asked whether it wishes to place an order for advertisements to be delivered.

Figure 3:
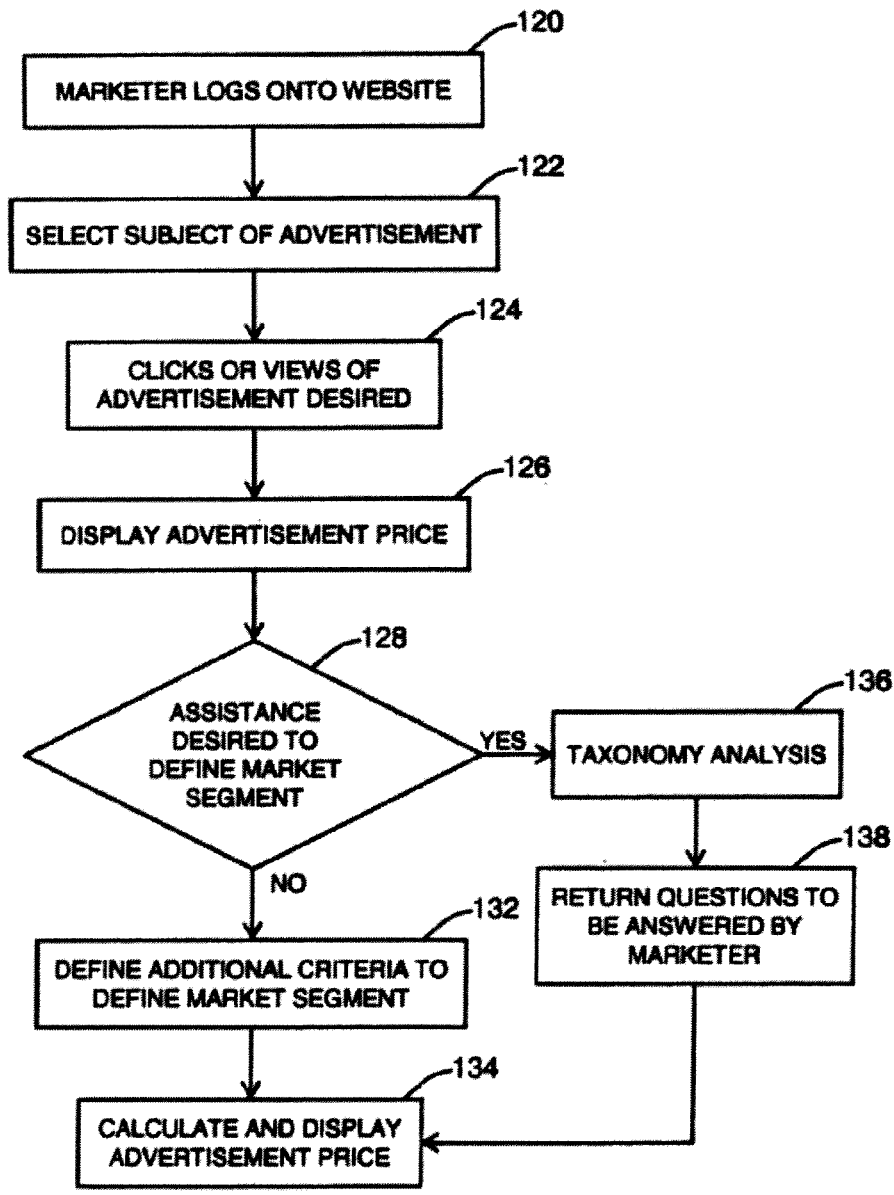
FIG. 3 is a flow diagram of a process for defining a market segment of consumers that is to receive an advertisement.

With reference back to how the market segment is defined (100 in FIG. 1), with reference to FIG. 3, at 120 the marketer logs onto a secure web site, which in the exemplary method is the non-consumer portal 24 in FIG. 1. The web site can be run by the advertisement delivery provider.

At 122 the marketer is presented with a screen that asks the marketer to select the item or service that is to be the subject of the advertisement that the marketer wishes to be delivered to consumers. In the example that is discussed above, the marketer may enter "cars" or "sports cars."

At 124, the marketer is then prompted to input the desired number of views or clicks of its advertisement that it wishes to obtain. A view is simply a posting of the advertisement on a web site that is viewed by the consumer. A click is when the consumer clicks on the advertisement and is taken to another web site, which is typically operated by the marketer, or an agent of the marketer, and further information can be provided about the service or product that is the subject of the advertisement.

At 126 the price that the marketer will pay for the advertisement to be displayed or clicked on the consumers portal 26 (FIG. 1) is displayed on the web page. The price of the advertisement can be a function of the product or service that is the subject of the advertisement. The price can also be a function of whether the advertisement is clicked or simply viewed. For example, products or services having a higher sales price will typically have a higher price per view or click and lower priced items or services will typically have a lower price per view or click.

At 128 the marketer will then be asked whether it wishes to be assisted in defining a market segment for its product or service or whether it wishes to define the market segment without assistance. If the marketer does not desire assistance in defining the market segment, for example the marketer is knowledgeable of the customers who desire its products, then at 132 the marketer is provided with additional criteria by which it can define the market segment. For example, at 132 the marketer can be presented with a grab bag of options to further define the market segment, examples of which include customers who have a current car payment that is within a certain monetary range, customers of a particular sex, customers of a particular age, customers who live in a particular zip code, etc. The grab bag of options may also include criteria that does not correlate exactly to the data stored in either the financial institution data base or the advertisement delivery provider database. For example, the grab bag could include such options: a range of money that the consumer allocates to entertainment, the amount of money spent on travel and other similar criteria. For these aforementioned criteria, the software operating on the system can be designed to calculate the entertainment budget of the customer by adding the monthly transactions of the customer such as movie tickets, concert tickets, sport events, dining, etc. Additionally, the software may factor that some of these purchases may also be in cash, which would not show up as a financial transaction in either database, and account for this by adding some percentage of the monthly total to the customer's budget. The budget can be averaged over a time period, e.g. year. At 134 the price of the advertisement is then recalculated with each additional criterion that is chosen by the marketer. The price is then displayed on the web site. The more criteria that is selected by the marketer to define the market segment, typically the higher the price of the advertisement.

If the marketer wishes to be assisted in defining a market segment for its product or service, then at 136 the product or service that is the subject of the advertisement is filtered by way of a taxonomy analysis. The taxonomy analysis classifies the good or service that is the subject of the advertisement. Based on the classification of the good or service that is the subject of the advertisement, questions are presented to the marketer to aid in defining the market segment at 138. For example, if the subject of the advertisement is a car, then the marketer can be prompted to decide whether it wishes to deliver advertisements to consumers who have paid 33 monthly installments on a car lease, which is an indication that the lease is about to expire. Another example would be if the subject of the advertisement is a home mortgage refinance product, the marketer can be prompted to decide whether it wishes to deliver advertisements to consumers who originated a mortgage in a certain year (for example, a year in which interest rates were known to be higher than they are at the time that the advertisement will be delivered). After the marketer has answered each question, which further defines the market segment, the price of the advertisement is displayed at 134 as a function of the criteria chosen by the market (by way of answering the questions).

Figure 4:
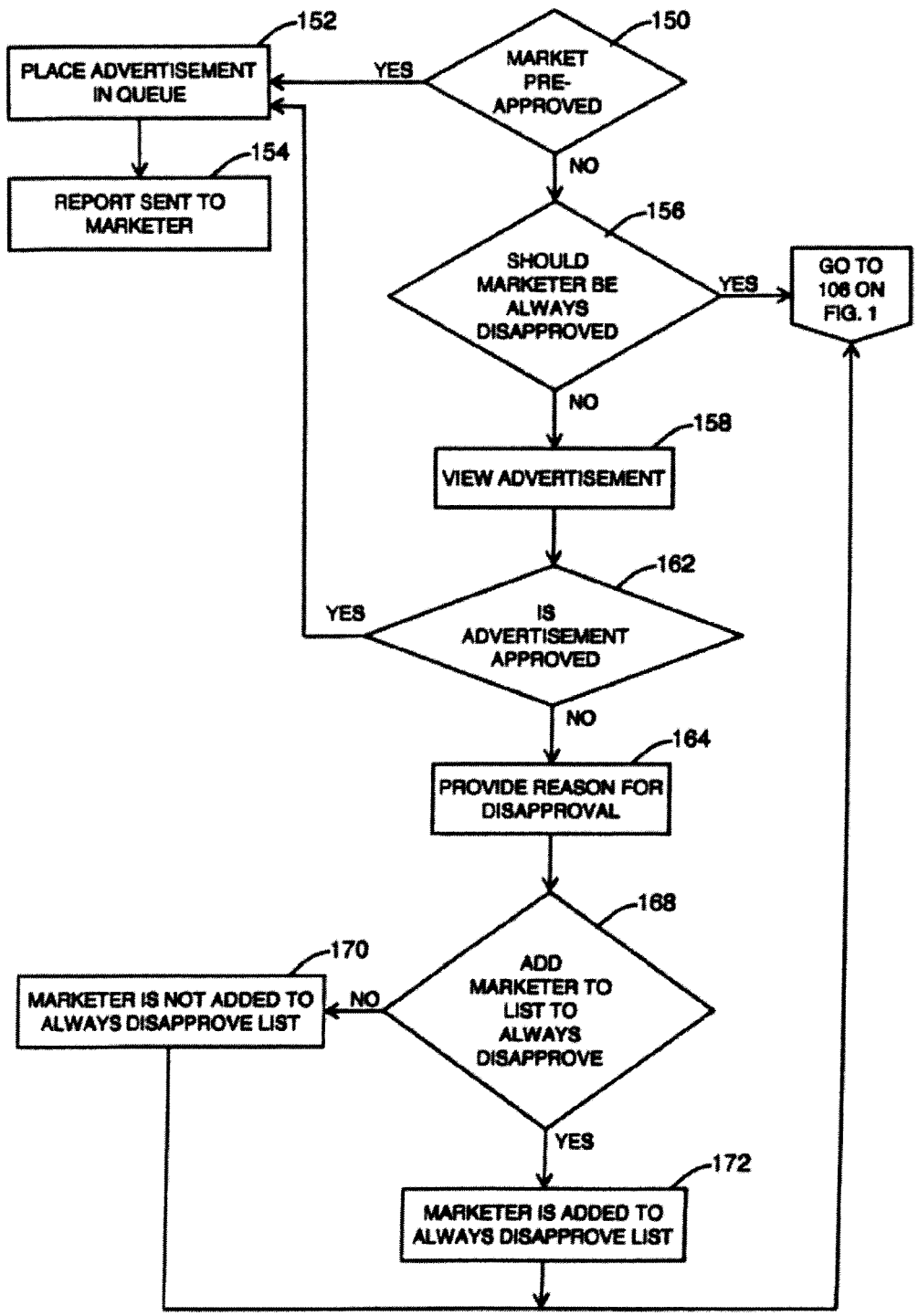
FIG. 4 is a flow diagram of a process for approving an advertisement to be displayed on a web site.

FIG. 4 more particularly describes how the site (or sites) that is/are to present the advertisement approve(s) or disapprove(s) of the advertisement(s) that are to be delivered on its site(s). At 150, the software that is operated by the advertisement delivery provider determines whether the marketer that wishes to have the advertisement displayed is a pre-approved marketer. Operators of web sites that will display advertisements can pre-approve certain marketers or classifications of marketers that are approved to display advertisements on their web sites. Whether the marketer is already a pre-approved marketer or is similar to a preapproved marketer and how many web site operators have pre-approved the marketer can have an effect on how quickly its advertisement will be viewed or clicked by the predetermined threshold of consumers that it desires to view or click its advertisement.

At 152, if the marketer has been preapproved by the web site operator that will display the advertisement, then the advertisement is automatically approved and placed in a queue of advertisements that are waiting to be viewed by customers who log onto the operator's web site and who are within the market segment that has been defined by the marketer. The queue of advertisements can be stored in the advertisement delivery provider database 22 (FIG. 1). At 154 a report can be generated and sent to the marketer informing the marketer of the web sites that have approved the marketer's advertisement.

If the marketer has not been preapproved by the web site operator, then at 156 the advertisement delivery provider determines whether the marker is a marketer or a classification of marketer that is always disapproved by the operator of the web site. If the marketer is a marketer or is in a classification that is always disapproved by the web site operator, then a report is generated, at 106 on FIG. 1, informing the marketer of the disapproval status.

If marketer is not always disapproved, then the advertisement is viewed by the web site operator at 158. The web site operator can be sent the advertisement via e-mail or the web site operator can log onto a web site, which can be the non-consumer portal 24 in FIG. 1, that is operated by the advertisement delivery provider to view the advertisement(s) awaiting approval. The web site operator then approves or disapproves the advertisement at 162. If the advertisement is approved, then the advertisement is placed in the queue at 152 and the report is generated at 154. If the advertisement is not approved, then at 164 the web site operator who was requested to display the advertisement is asked to answer why the advertisement has been disapproved. The web site operator, at 166, is also given the option to deny all advertisements from this particular marketer or classification of marketer. If the web site operator chooses to always disapprove the marketer, then at 172 the marketer is added to an always disapprove list and the marketer will always be disapproved by the web site operator. If the web site operator chooses to not always disapprove the marketer, then the marketer is not placed on the always disapprove list. The marketer is then notified that the advertisement has been disapproved by the web site operator.

Figure 5:
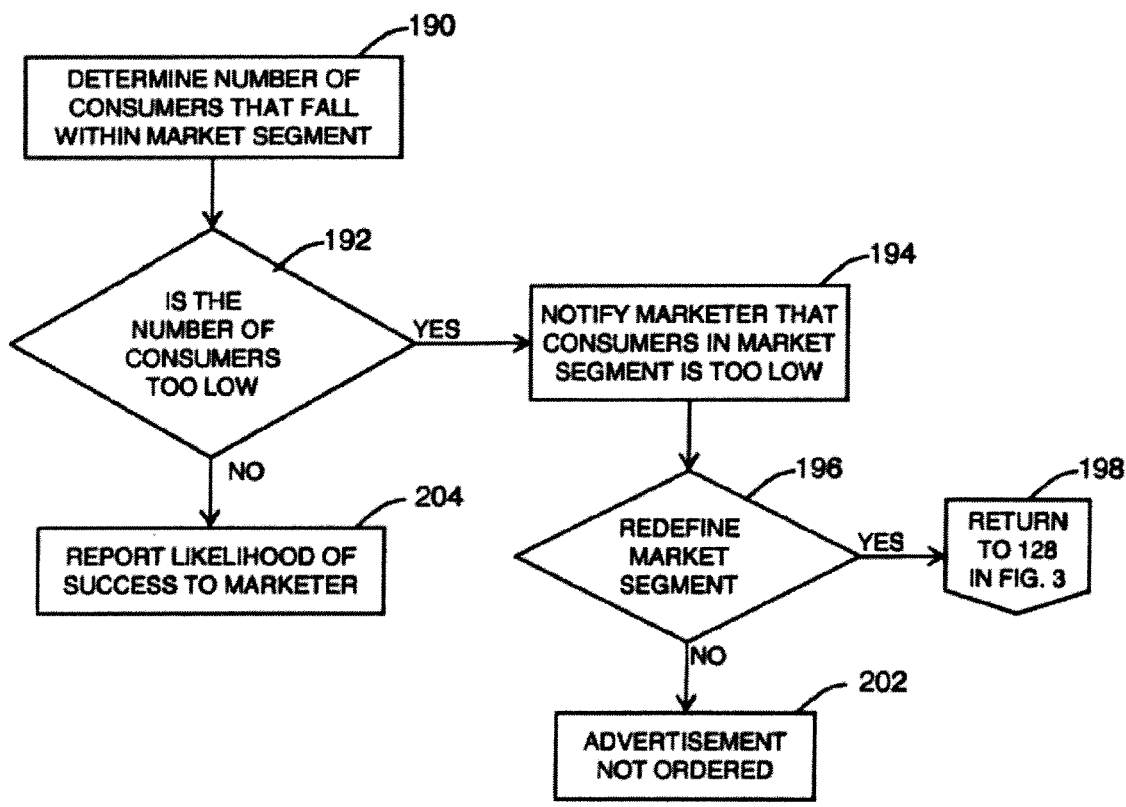
FIG. 5 is a flow diagram of a process for determining the success of an advertising campaign.

With reference back to FIG. 2, after the advertisement has been approved by the web site that is to display the advertisement—the advertisement may be displayed on a number of different web sites, each requiring some sort of approval—the projected success of the advertisement reaching the predetermined threshold of consumers is determined at 108. FIG. 5 provides a more detailed description of how the projected success is determined.

With reference to FIG. 5, at 190 the number of consumers in the advertisement delivery provider database that fall within the market segment is determined. This is accomplished by querying the advertisement delivery provider database to locate the consumers that match the market segment that has been defined by the marketer. At 192, the software running on the system determines if the number of consumers in the market segment is too low. If the number of consumers that match the market segment is too low, then, at 194, the marketer is notified that there is a small likelihood that the advertisement will be viewed by the number of consumers that the marketer would like to view the advertisement. An example of the consumers in the market segment being too low is where the marketer wishes to display their advertisement 100,000 times but the advertisement delivery provider database only returns 100 eligible consumers in the market segment, then the advertisement will most likely take too long to display 100,000 times. At 196, the marketer will be given the option to redefine the market segment to reach a greater number of consumers. If the marketer chooses to redefine the market segment, then, at 198, the marketer is returned to 128 in FIG. 3 to see if the marketer desires assistance in defining the market segment. In addition to, or in lieu of returning to fully redefining the market segment, at 198 the marketer can also be presented with recommendations for increasing the number of consumers within the market segment. The software of the system can break out the criteria used to define the market segment and suggest that if certain criteria for the market segment were to be removed then the number of consumers that could view the advertisement could be increased. For example, the marketer could be presented with the option to define the market as including both males and females, where the original market segment criteria was limited only to females. If the marketer chooses not to redefine the market segment, then, at 202, the advertisement is not ordered by the marketer.

If the number of consumers is not too low, for example if the marketer desires 100,000 views of the advertisement and 75,000 consumers qualify for the market segment, then, at 204, the software of the system returns a report to the marketer that the advertising campaign should be successful. The report can include an estimate of the time it will take the advertisement to display the desired number of views of the advertisement. This information can be based on the number of consumers who have qualified for the market segment and the web surfing habits of the consumers in the market segment.

Moving to the consumer side of the advertisement delivery process, at 220 the consumer 14 (FIG. 1), who is also a customer of the financial institution 12 (FIG. 1), logs onto the financial institution's web site. The consumer logs onto a protected portion of the financial institution's web site where the consumer must identify himself appropriately so that, for example, the financial institution allows the user to perform banking transactions over the Internet.

After the consumer logs onto the financial institution's web site software that is running on the financial institution's web site, which is also part of the system 8 (FIG. 1), checks for the presence of a cookie, or similar file, stored on the consumer's computer at 222. The cookie included is a text file that is stored on the consumer's computer that includes the ADIC. If the cookie is not present, then at 224 the software that is running on the financial institution's web site assigns an ADIC for the customer that corresponds with the UCIC for that consumer. The UCIC is known since the consumer has logged into the financial institution's secure web site, thus verifying the identity of the consumer. This ADIC is then stored as a cookie on the consumer's computer for later reference.

If the cookie is present or after the cookie has been stored on the consumer's computer, then at 226 the software queries the advertisement delivery provider database for defined market segments for advertising campaigns for which the customer qualifies. At 228, the software determines whether the customer qualifies for any market segments for advertising campaigns that are warehoused in the advertisement delivery provider database. If the customer does not belong to a defined market segment, then at 232 a non-targeted advertisement is displayed on the web site. If the customer belongs to a defined market segment, then at 234 a targeted advertisement can be displayed on the web site.

If the consumer belongs to a plurality of market segments, then a plurality of advertisements that correlate to the market segments can be delivered to the web site for display. As discussed above, the web site can display a tab that can be clicked to display all of the advertisements for which the consumer qualifies. Alternatively, the software can be designed to display only a few of advertisements that correlate to the market segments in which the customer resides. The software can be designed to deliver the advertisements for which the greatest price was paid by the marketer to have their advertisements displayed.

The consumer can also indicate to the institution that he/she is not interested in receiving any such advertisement and so the institution, or the delivery provider, will block the delivery of any advertisements to that consumer.

Figure 6:
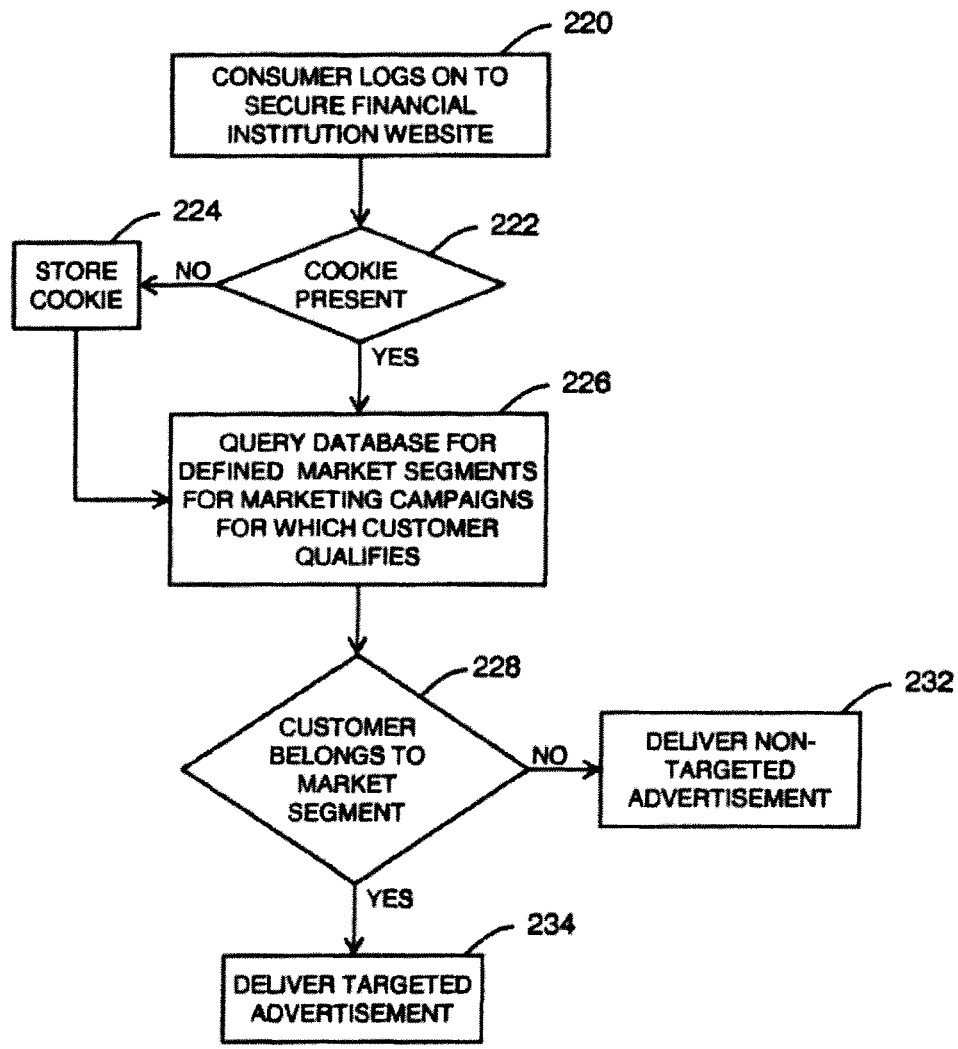
FIG. 6 is a flow diagram depicting a process for delivering an advertisement to a consumer.
Figure 7:
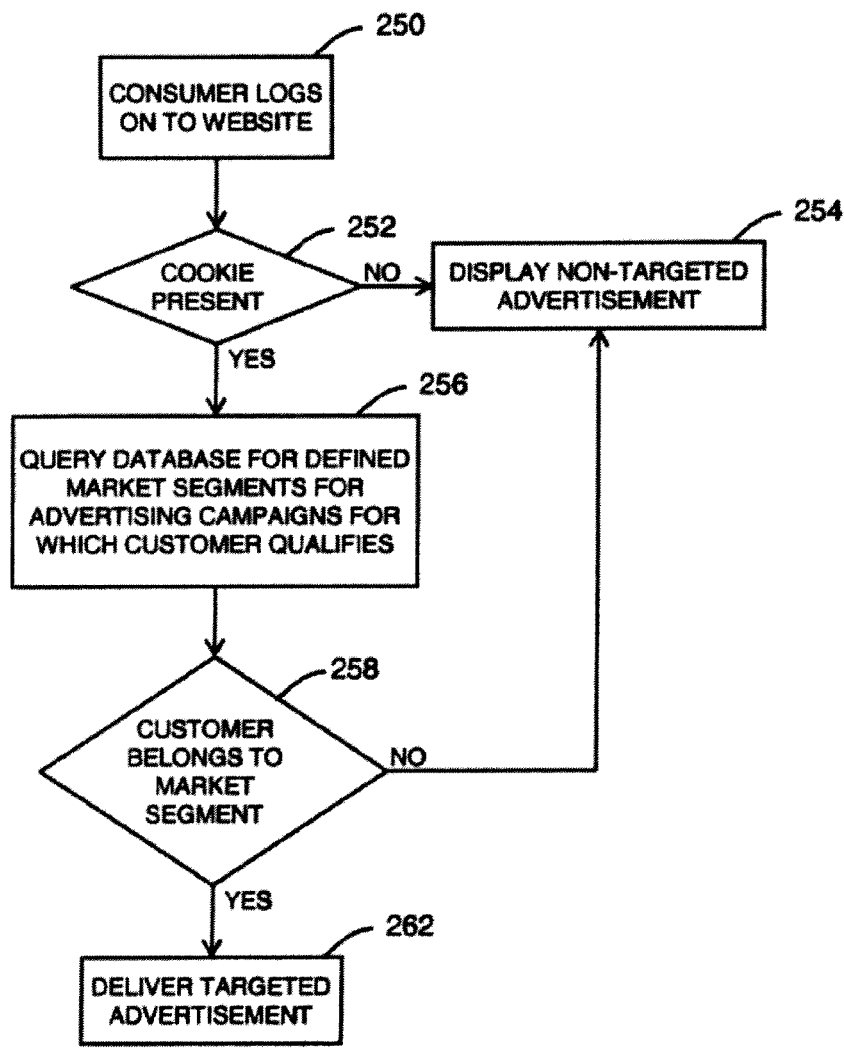
FIG. 7 is a flow diagram of another process for delivering an advertisement to a consumer.

With reference to FIG. 7, where a consumer logs onto a web site that is operated by a third party advertisement presenter, i.e. a web site that is not a secure web site of a financial institution (e.g. cnn.com, espn.com) the process for delivering an advertisement is slightly altered as compared to the process depicted in FIG. 6. At 250 the consumer logs onto a third party advertisement presenter's web site. At 252, the software running on the third party presenter's web site checks for a cookie containing the ADIC. If the cookie is not present, at 254, a non-targeted advertisement is delivered to the web site for the consumer to view. If the cookie is present, then at 256 the software queries the advertisement delivery provider database for defined market segments for advertising campaigns for which the customer qualifies. At 258, the software determines whether the customer qualifies for any market segments for advertising campaigns that are warehoused in the advertisement delivery provider database. If the customer does not belong to a defined market segment, then at 254 a non-targeted advertisement is displayed on the web site. If the customer belongs to a defined market segment, then at 262 a targeted advertisement can be displayed on the web site.

Similar to the process defined with regard to FIG. 6, if the consumer belongs to a plurality of market segments, then a plurality of advertisements that correlate to the market segments can be delivered to the web site for display. As discussed above, the web site can display a tab that can be clicked to display all of the advertisements for which the consumer qualifies. Alternatively, the software can be designed to display only a few of advertisements that correlate to the market segments in which the customer resides. The software can be designed to deliver the advertisements for which the greatest price was paid by the marketer to have their advertisements displayed. In other words, an advertisement that costs $10 per display will have a greater likelihood of being delivered to a web site than an advertisement that costs $5.

Figure 8:
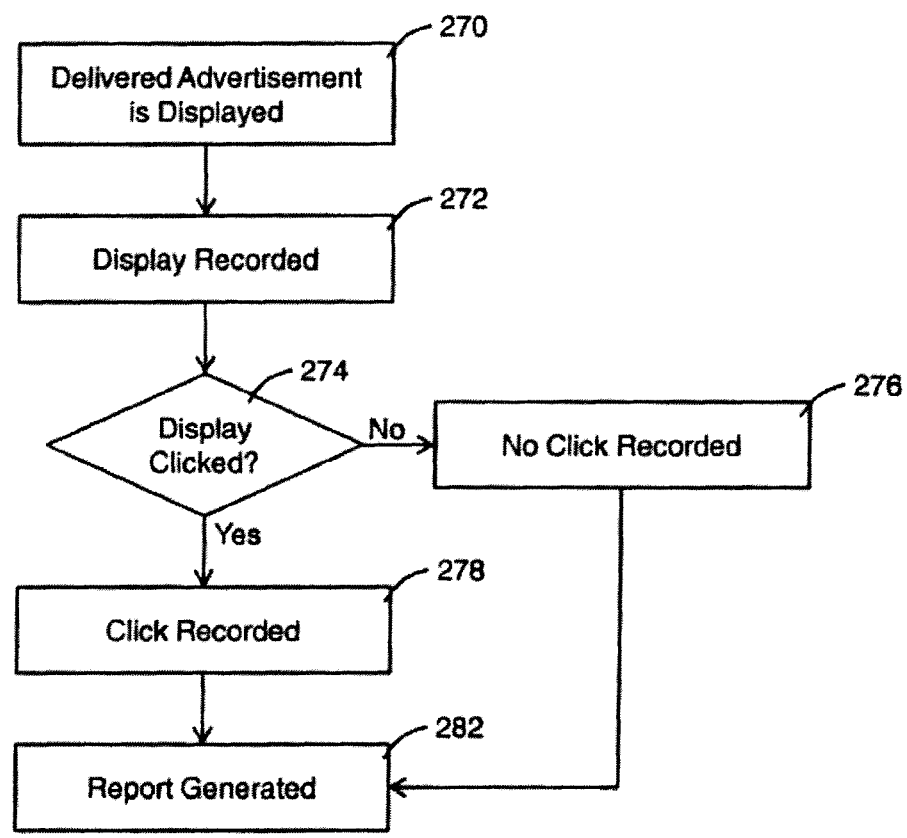
FIG. 8 is a flow diagram for a method for recording the display and the click of a targeted advertisement.

With reference to FIG. 8, the results of the advertisement display are reported to the marketer. At 270 the delivered targeted advertisement is displayed on the web site that the consumer is viewing (whether the web site is the secure web site of a financial institution or a third party advertisement presenter's web site). At 272 the software of the system records that the advertisement has been displayed. At 274 the software determines whether the advertisement has been clicked. If the consumer does not click on the advertisement, then this action is recorded at 276. If the consumer does click on the advertisement, then the consumer is directed to another web site, typically operated by the marketer, and this action is recorded at 278. At 282 a report is generated that is sent to the marketer that provides the results of the advertising campaign. Since the marketer can pay for an advertisement on a "view or display" basis and on a "click" basis, the report can provide a basis for billing the marketer for the advertising campaign. Moreover, the report can provide the marketer information such as the percentage or viewed advertisements that were clicked, which will be helpful in defining future market segments for similar products.

Figure 9:
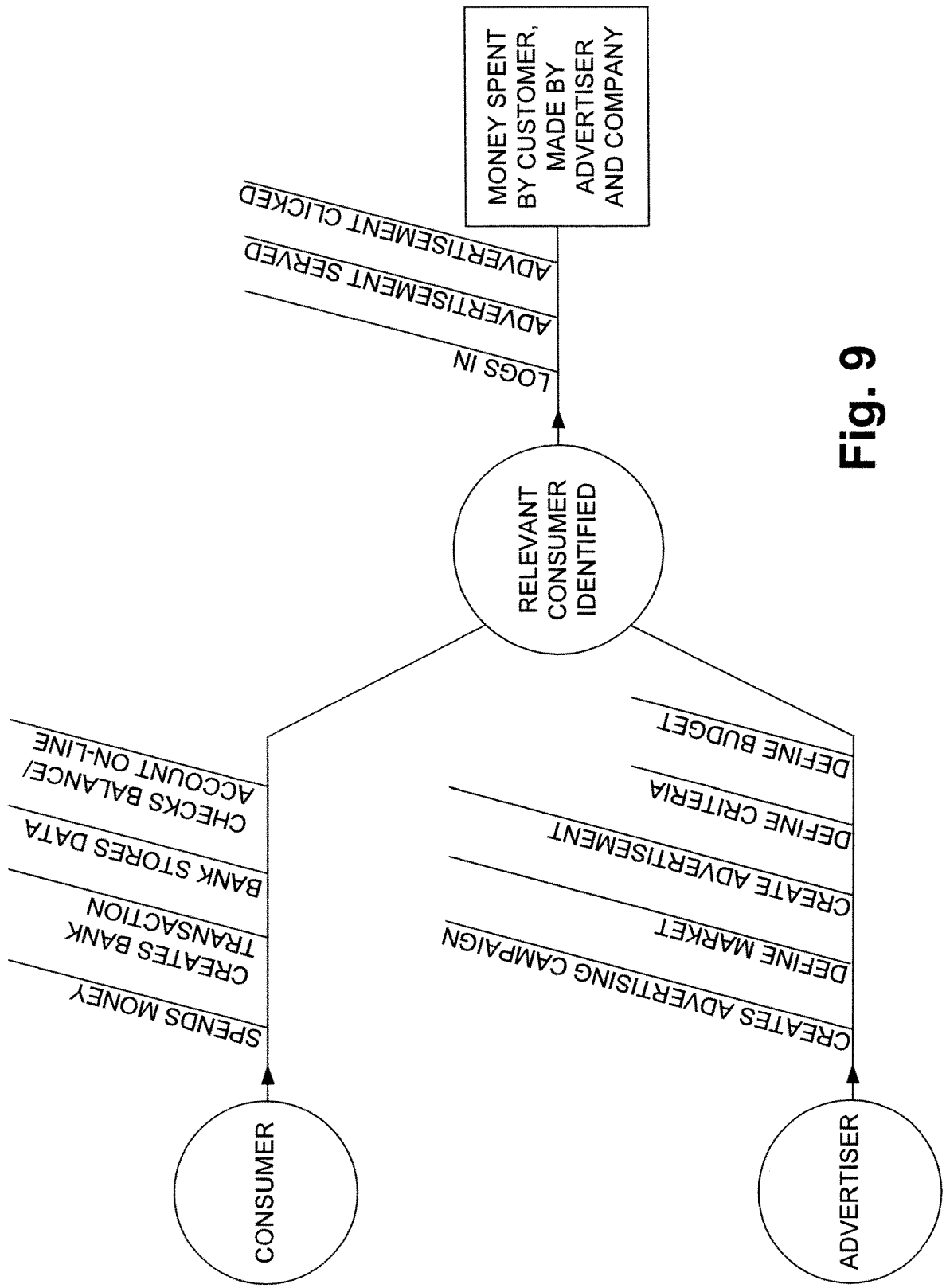
FIG. 9 is a schematic diagram illustrating the pertinent activities of the consumer and advertiser in the context of the present embodiment.

FIG. 9 is a schematic diagram illustrating the pertinent activities of the consumer and advertiser in the context of the present embodiment.

Figure 10:
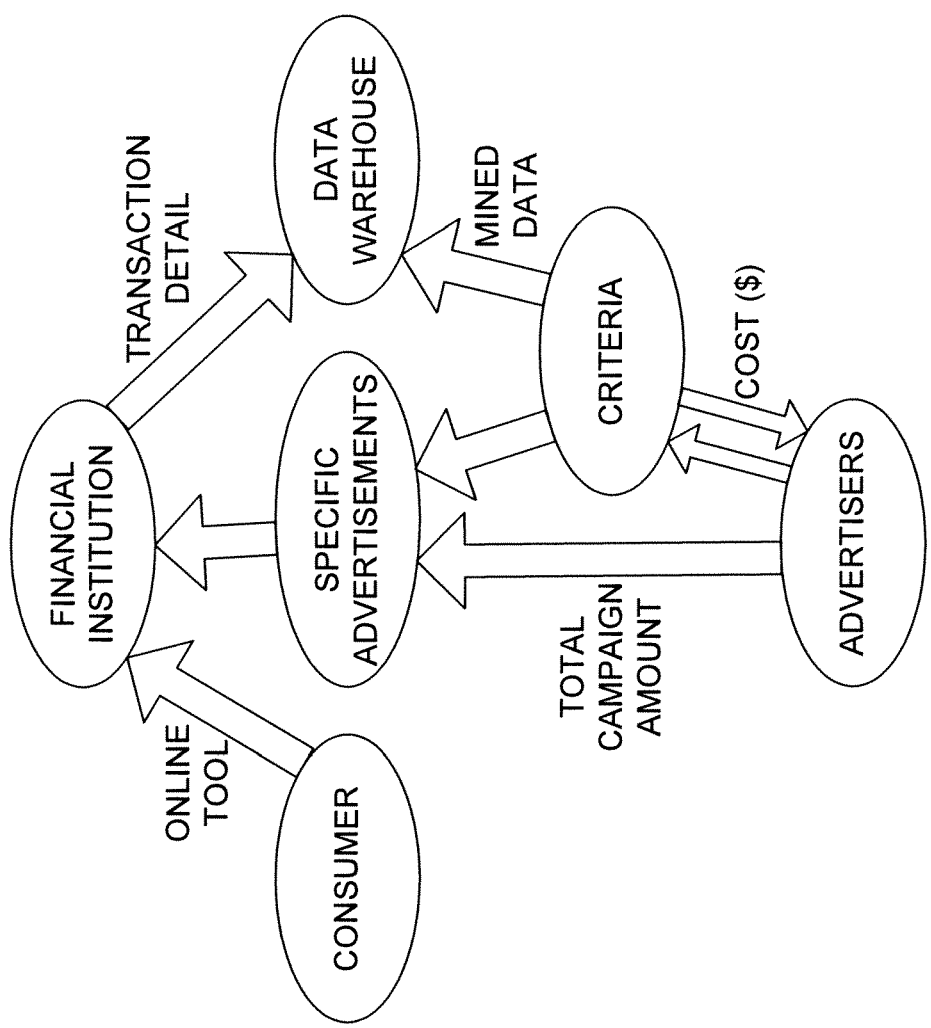
FIG. 10 is a diagram showing communication paths between consumers, advertiser, the bank and the advertisement delivery provider.

FIG. 10 is a diagram showing communication paths between consumers, advertiser, the bank and the advertisement delivery provider.

Figure 11:
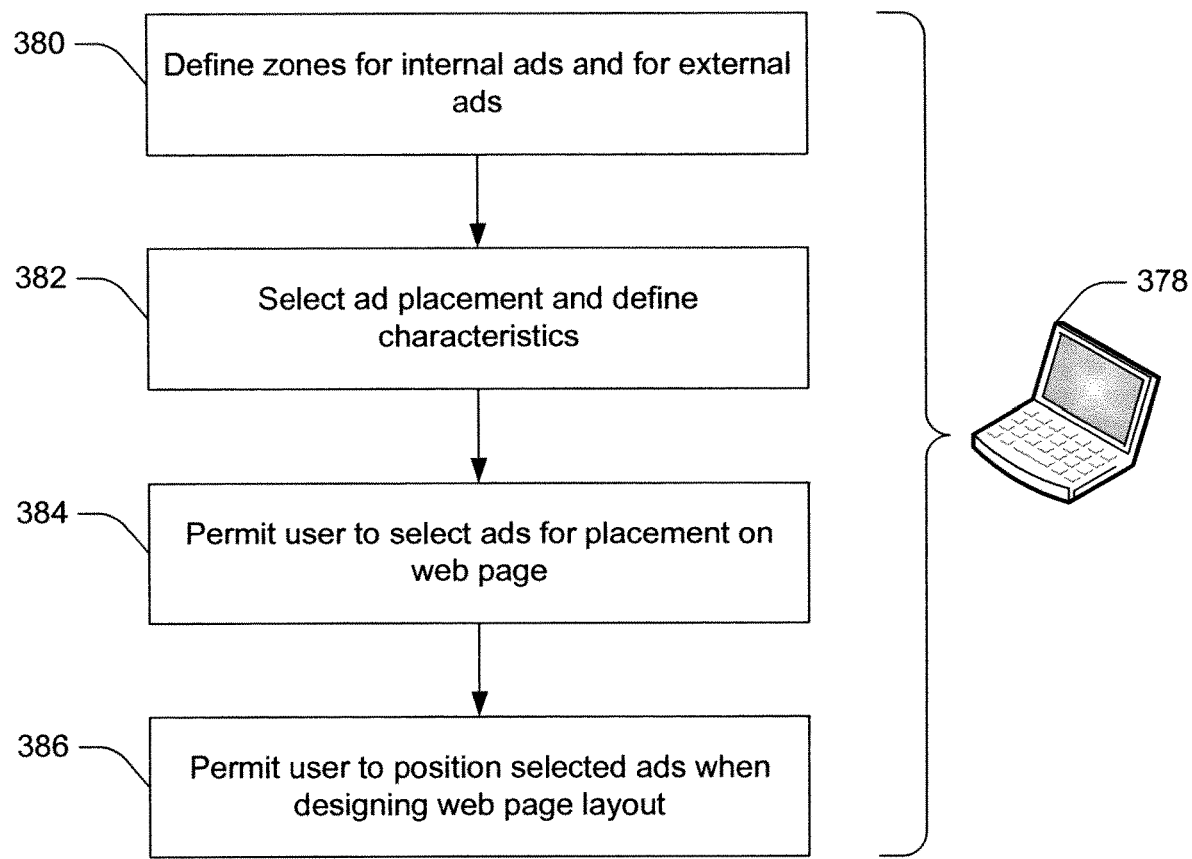
FIG. 11 illustrates a flow diagram for a method of arranging targeted advertisements on a web page using pre-defined advertisement zones or tiles arranged in a manner that mitigates distraction to the marketer while visiting the web page while concurrently presenting the advertisements and offers to the customer in a way that ensures they will be noticed by the customer.

FIG. 11 illustrates a flow diagram for a method of arranging targeted advertisements on a web page using pre-defined advertisement zones or tiles arranged in a manner that mitigates distraction to the marketer while visiting the web page while concurrently presenting the advertisements and offers to the customer in a way that ensures they will be noticed by the customer. For example, if the advertisements are presented to the customer on a financial institution's web page upon logging in to the customer's bank account web page, it is desirable that the advertisements do not distract the customer from other important bank notices, such as bills due, transactions requiring the customer's attention, etc. Therefore, advertisement placement zones are defined in specific regions (e.g., corners, perimeter areas, etc.) of the web page.

The method may be executed on a computer 378. According to the method, at 380, zones are defined for internal ads (e.g., ads from the financial institution, in the present example), and for external ads (e.g., from a vendor advertising a product or service targeted to the customer using the ADICs described herein). At 382, advertisement placement zones are selected, and characteristics therefor are defined. For instance, a marketer (e.g., a designer of the web page or the like) selects one of the predefined advertisement zones, and defines characteristics (e.g., size or dimensions, shape, or other parameters, of the zone, etc.) for the selected zone. According to one aspect, characterization of the advertisement includes adding or activating designated interaction region in or on the advertisement zone. For instance, the designated interaction region may be a frame or border around the advertisement zone. When a customer views the advertisement and hovers a cursor over, or clicks on, the designated interaction region, a dropdown menu is presented to the customer and includes one or more selectable options (e.g., see more details, save offer to offer library, no thanks, remind me later, see offer library, etc.). The specific menu options may also be entered by the marketer during the zone characterization step.

At 384, the marketer selects an advertisement for placement in the characterized advertisement zone. At 386, the marketer is permitted to position the selected advertisements in any of the predefined, characterized zones when designing the web page. In one embodiment, the marketer is permitted to reposition advertisements in predefined, characterized zones to view different permutations of advertisement placement possibilities on the web page prior to finalizing the web page. In another embodiment, advertisement zone characterization is performed after advertisement placement.

Although the method of FIG. 11 is described with regard to a financial institution, it will be appreciated that the systems and methods described herein are not limited to financial institutions' web pages, but rather may be employed in conjunction with any suitable web page(s).

Figure 12:
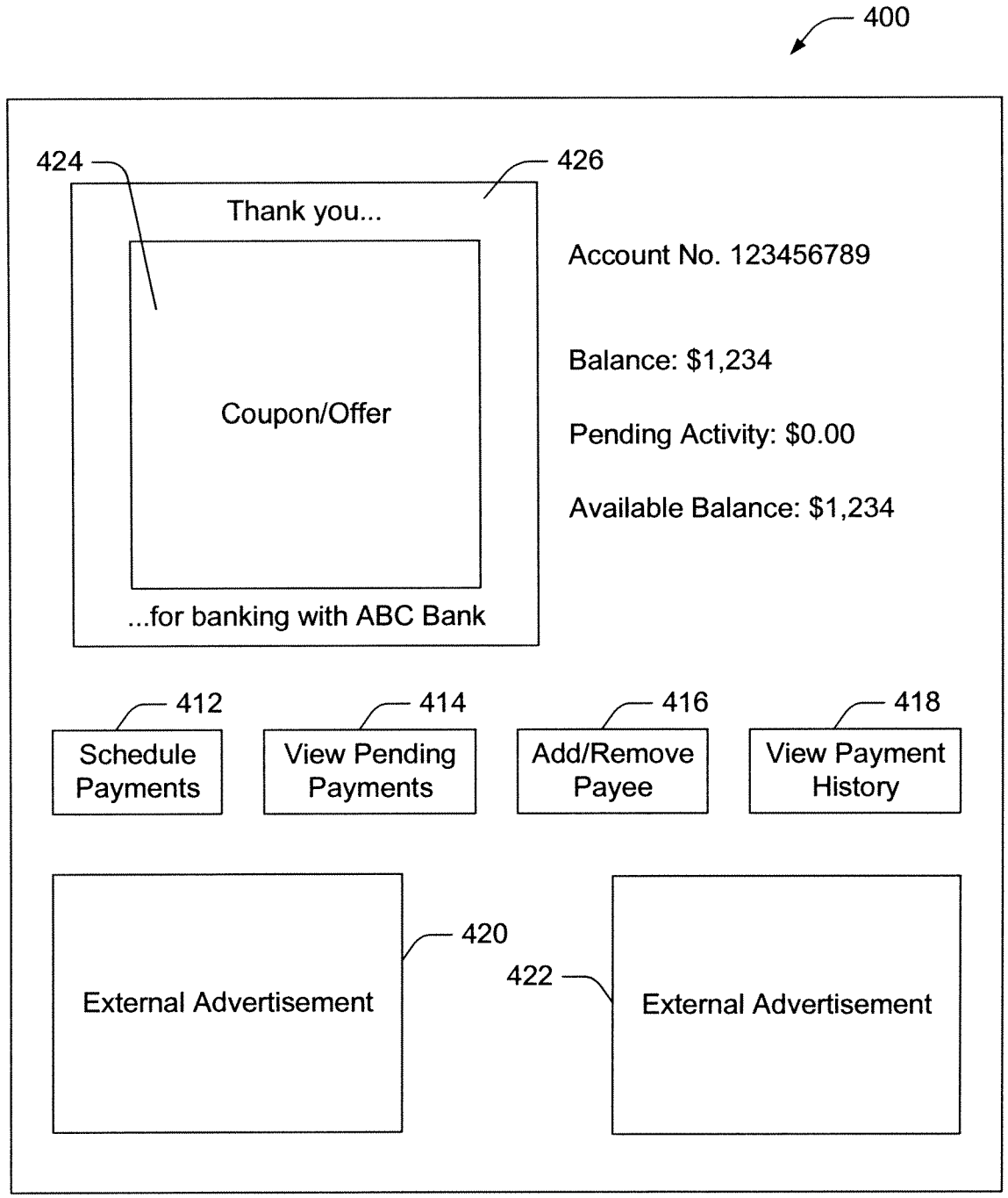
FIG. 12 illustrates an example of a web page that is presented to a customer when the customer logs into his financial institution website.

FIG. 12 illustrates an example of a web page 400 that is presented to a customer when the customer logs into his financial institution website, such as may be generated using the method according to FIG. 11. It will be appreciated, however, that the described systems and methods are not limited to financial institutions' websites, but rather may be employed in conjunction with any suitable website. In one example, a cookie is placed in the customer's computer, by which the described systems and methods track the customer's web-browsing session and present targeted offers on any web page the user visits that has available space for advertisement placement.

The example web page 400 includes the customer's account information (e.g., account number, balance information, etc.) and a number of selectable tabs or buttons 412, 414, 416, 418 on which the customer may click to perform one or more activities (e.g., schedule payments, view pending payments, add or remove a payee for electronic payments, view payment history, etc.). The web page 400 additionally includes one or more external advertisements 420, 422, which may be placed using the systems and methods described above with regard to FIGS. 1-11 (e.g., using UCICs and ADICs, etc.). An internal offer or advertisement 424 from the financial institution is presented to the customer. The internal advertisement 424 may be a coupon or discount for an item for which the customer is believed to be in the market (e.g., according to the customer's ADIC) or may be a promotional offer to entice the customer open a new account, etc. The internal advertisement 424 includes a designated interaction region 426 such as a border or frame that the customer may hover a cursor over to view a pop-up or drop-down menu or the like.

Figure 13:
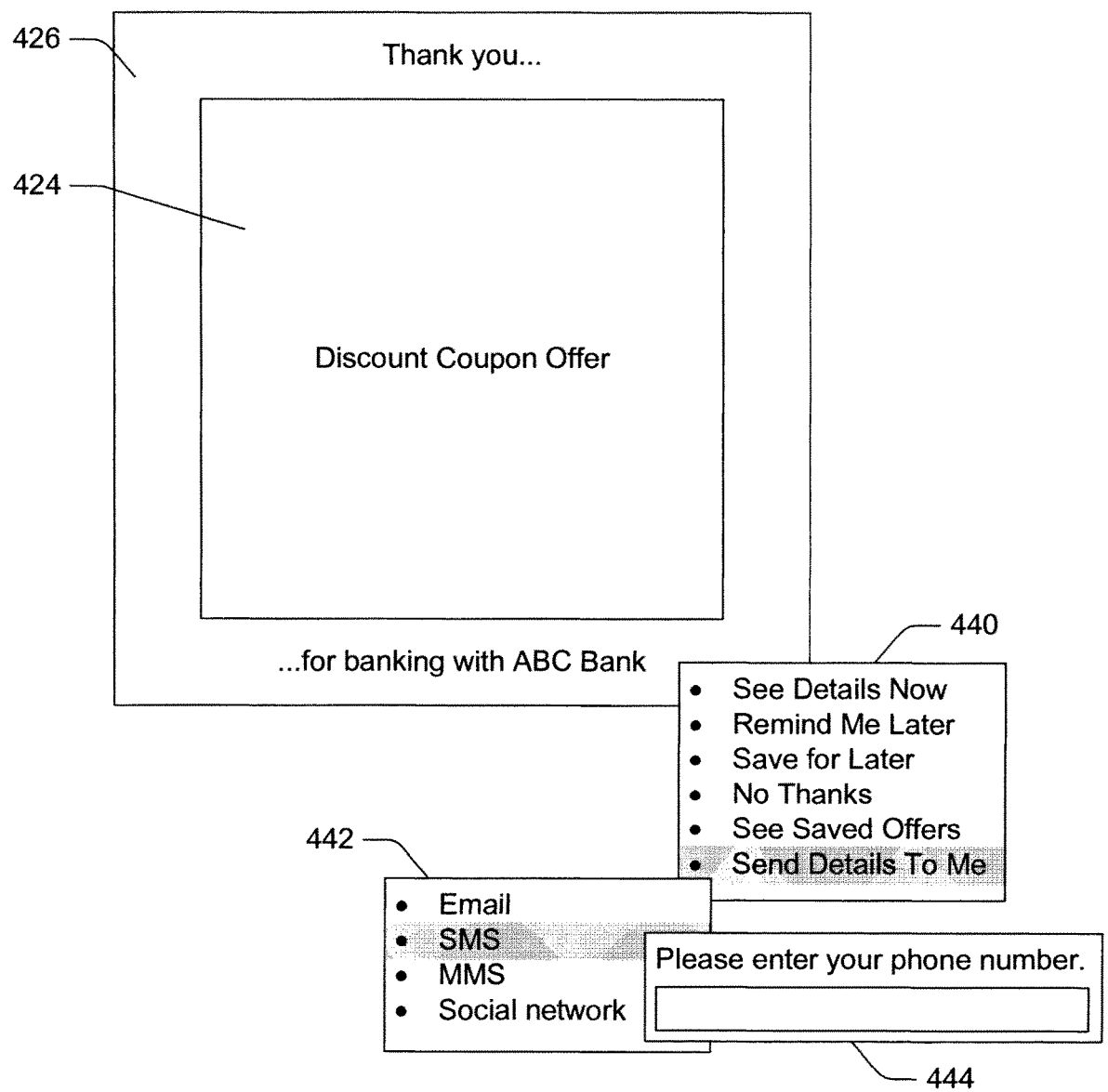
FIG. 13 illustrates the advertisement after a customer has hovered over or clicked on a designated interactive region of the internal advertisement, causing a menu to be displayed.

FIG. 13 illustrates the advertisement after a customer has hovered over or clicked on the designated interaction region of the internal advertisement 424, causing a menu 440 to be displayed. The menu 440 may be a drop down menu, a pop-up menu, a menu that slides horizontally inward or outward (relative to the advertisement) from the advertisement designated interaction region, etc. The menu comprises a plurality of selectable options on which the customer may click to initiate a specific action relative to the advertisement. For instance, the options may include, without being limited to, one or more of an option to see further details of the offer, an option to set a reminder to review the offer at a later time (e.g., before navigating away from or logging off of the web page), an option to save the offer to an offer library that the customer may review at any later time (e.g., before or after navigating away from or logging off of the web page), an option to decline the offer, an option to have the offer sent to the customer via one or more messaging services (e.g., text or short message service (SMS), multimedia message service (MMS), email, social networking media (e.g., Facebook, MySpace, Twitter, etc.) etc. If the customer selects the option to have the details of the offer sent to him, the customer presented with an additional menu 442 from which to select a means for sending the offer details (e.g., email, SMS, MMS, social network alias, etc. Once the customer selects the means for sending the offer information, the customer is prompted to provide a cell phone number, email address, or the like to which the offer details can be sent and is provided with a field 444 in which to enter the number or address information. Additionally, the menu 440 includes a "See Saved Offers" option or the like, which when clicked on or otherwise selected by the customer, takes the customer to an offer library page on which are displayed all saved targeted offers. It will be appreciated that the foregoing menu options are provided by way of illustration and are not intended to limit the scope of the options that can be presented to the customer in conjunction with the described systems and methods.

Figure 14:
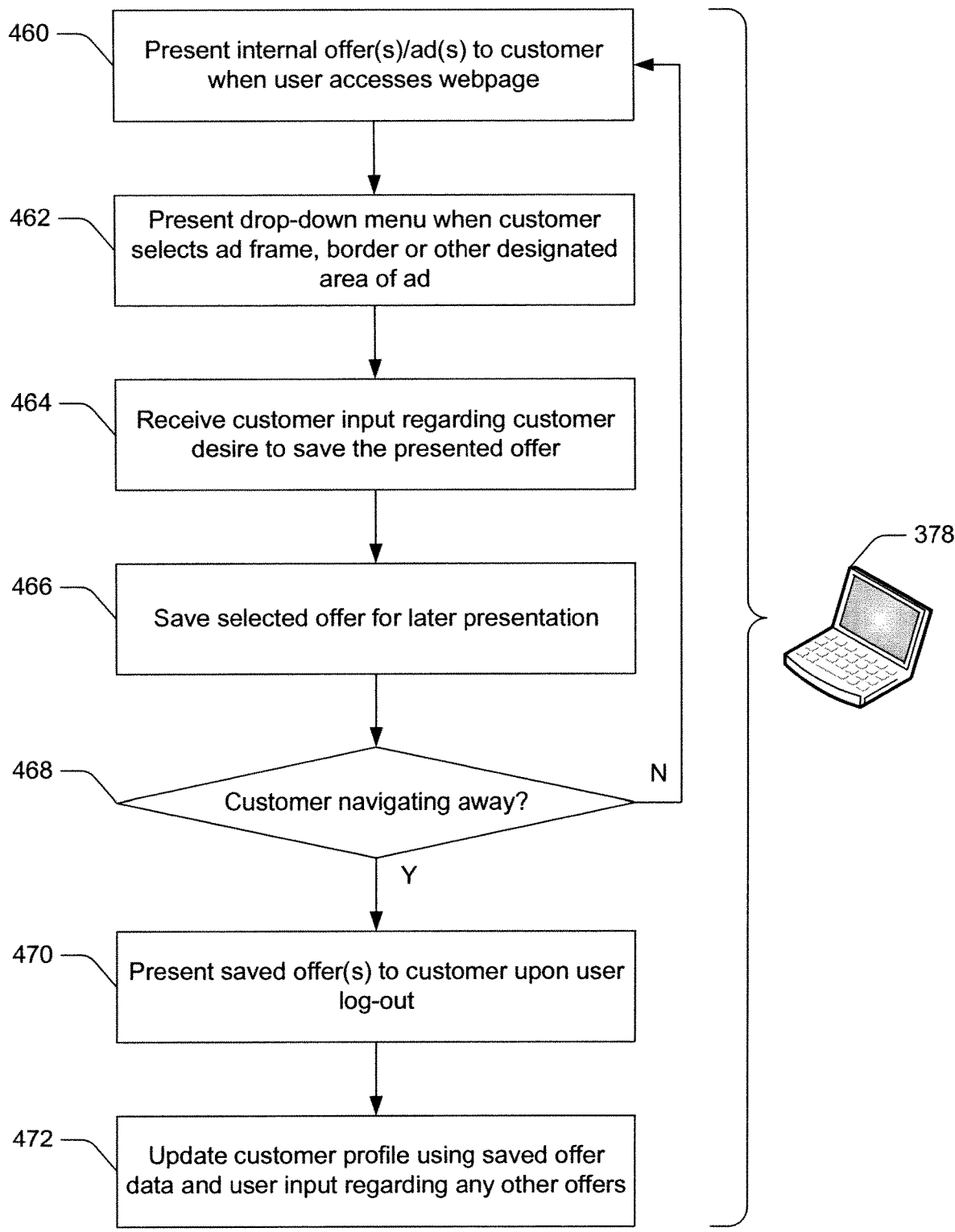
FIG. 14 illustrates a flow diagram for a method of presenting targeted offers to customers, storing customer-selected targeted offers in an offer library for later review by the customer, and updating the customer's profile (UCIC or ADIC) using customer input related to the targeted offer.

FIG. 14 illustrates a flow diagram for a method of presenting targeted offers to customers, storing customer-selected targeted offers in an offer library for later review by the customer, and updating the customer's profile (UCIC or ADIC) using customer input related to the targeted offer. The method may be executed on a computer 378. At 460, an internal advertisement for an offer is presented to a customer (e.g., upon the customer accessing the financial institutions website or some other website). At 462, a menu of selectable options is presented to the customer upon the customer clicking on, hovering a cursor over, or otherwise interacting with (e.g., touching a touch screen) a frame or border region around the ad or other designated interactive region of the ad. At 464, customer input regarding the offer is received (e.g., input regarding a selection of an option to save the offer to an offer library is received). At 468, the offer is saved to the offer library in response to the customer input. At 470, a determination is made regarding whether the customer is logging out of the webpage or otherwise navigating away from the web page. If not, then the method reverts to 460 where a new targeted offer is presented to the customer.

If the customer is logging out or navigating away from the webpage, then at 472, the saved offer(s) is/are presented to the customer for review. Alternatively, the customer can click on an offer library tab or button at any time to review saved offers. At 474, the customer's profile associated with one or both of the UCIC and/or ADIC (anonymous) is updated to reflect the customer's preferences as indicated by the customer selecting one or more offers for saving to the offer library.

In one embodiment, each time the customer selects an option, the customer's UCIC and/or ADIC is updated to reflect the customer's interests more accurately. For instance, if the offer is for a car lease and the customer selects "save for later" (e.g., save to the offer library), "see details now," or "remind me later," then the system infers that the customer is in the market for a car lease.

To further this example, the car lease offer is initially targeted to the customer based on the customer's ADIC, which indicates that the customer may be interested such an offer, for example, because the customer's bank account transactions show 33 consecutive monthly car lease payments, which information is used to infer that the customer's present car lease may be about to expire. If the customer selects a menu option that indicates interest in the car lease offer, then the customer's ADIC may be updated to increase a weight of an "automobile" metric or indicator in the ADIC, which encourages car lease or car loan offers to be targeted to the customer. That is, the selection of an option indicating interest in the car lease offer validates the "automobile" metric or indicator in the ADIC, and the system more readily presents car loan or lease offers to the customer, relative other offers. In one embodiment, different options indicative of customer interest are weighted according to a level of interest they indicate. For example, selection of a "see details now" may be weighted more heavily than "remind me later" or "save for later," since a customer who selects an option to immediately view the offer may be inferred to be more interested in the goods or services in the offer than a customer who places the offer in the offer library for review at some future date prior to offer expiration. The metric or parameter in the ADIC may be key lifestyle information or indicators (KLIs), such as are described in U.S. patent application Ser. Nos. 12/266,199, and 12/403,656, which are hereby incorporated herein by reference in their entireties.

Alternatively, if the marketer selects "no thanks" or some other option indicative of a lack of interest in the offer, then the customer's ADIC is updated to de-emphasize or remove the metric of KLI for the content of the offer (automobile lease or loan in this example).

According to one aspect, customer targeting is performed anonymously, using the ADICs and associated methods described herein. According to other aspects, customer targeting need not be anonymized, and is performed using the UCICs and associated methods described herein.

Figure 15:
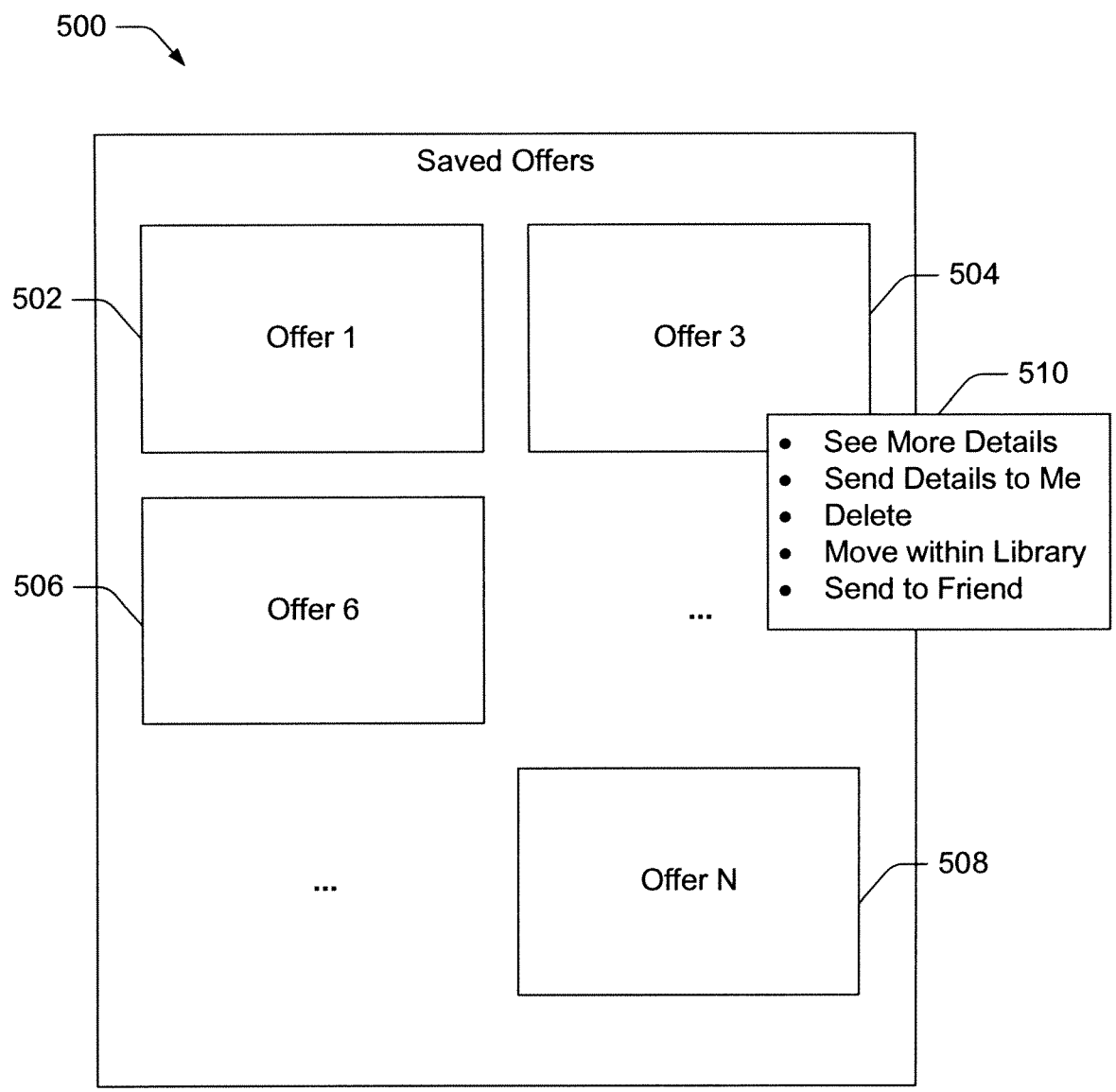
FIG. 15 is an illustration of an offer library in which are stored one or more targeted offers selected by the customer.

FIG. 15 is an illustration of an offer library 500 in which are stored one or more targeted offers selected by the customer. The customer need not store all presented offers, as shown by in FIG. 15, where a first offer 502, a third offer 504, sixth offer 506, and an Nth offer 508 (where N is an integer) are stored in the offer library. In the event that the customer does not review the offer library for some time after logging off the web page on which the offers were presented, the offer library automatically deletes offers upon their respective offer expiration dates. In one embodiment, the customer is notified (e.g., via email, a popup notification, etc.) when a saved offer is about to expire (e.g., within one day, one week, 12 hours, or some other predetermined or selected time period).

According to other features, a user may select (e.g., click on, hover over, etc.) an offer saved in the offer library and be presented with a menu 510 of options comprising actions to be taken with regard to the selected offer. For instance, the menu 510 can comprise one or more of: an option to view more details of the offer; an option to have additional details sent to the customer in a manner similar to that described with regard to FIG. 13; an option to delete the offer from the library; an option to move the offer within the library (i.e., to move the offer toward a top or bottom of the library, or otherwise sort the offer(s)); and an option to send the offer to a friend (e.g., via email, SMS<MMS, social network, or some other suitable means. In the latter case, the customer is prompted to enter an email address, phone number, etc., for the friend, depending on the manner of sending selected by the customer. The manners of sending can also be presented to the customer as a list of selectable media for sending the offer to the friend in a fashion similar to the menu 442 and field 444 as described with regard to FIG. 13. It will be appreciated that the foregoing menu options are provided by way of illustration and are not intended to limit the scope of the options that can be presented to the customer in conjunction with the described systems and methods.

Figure 16:
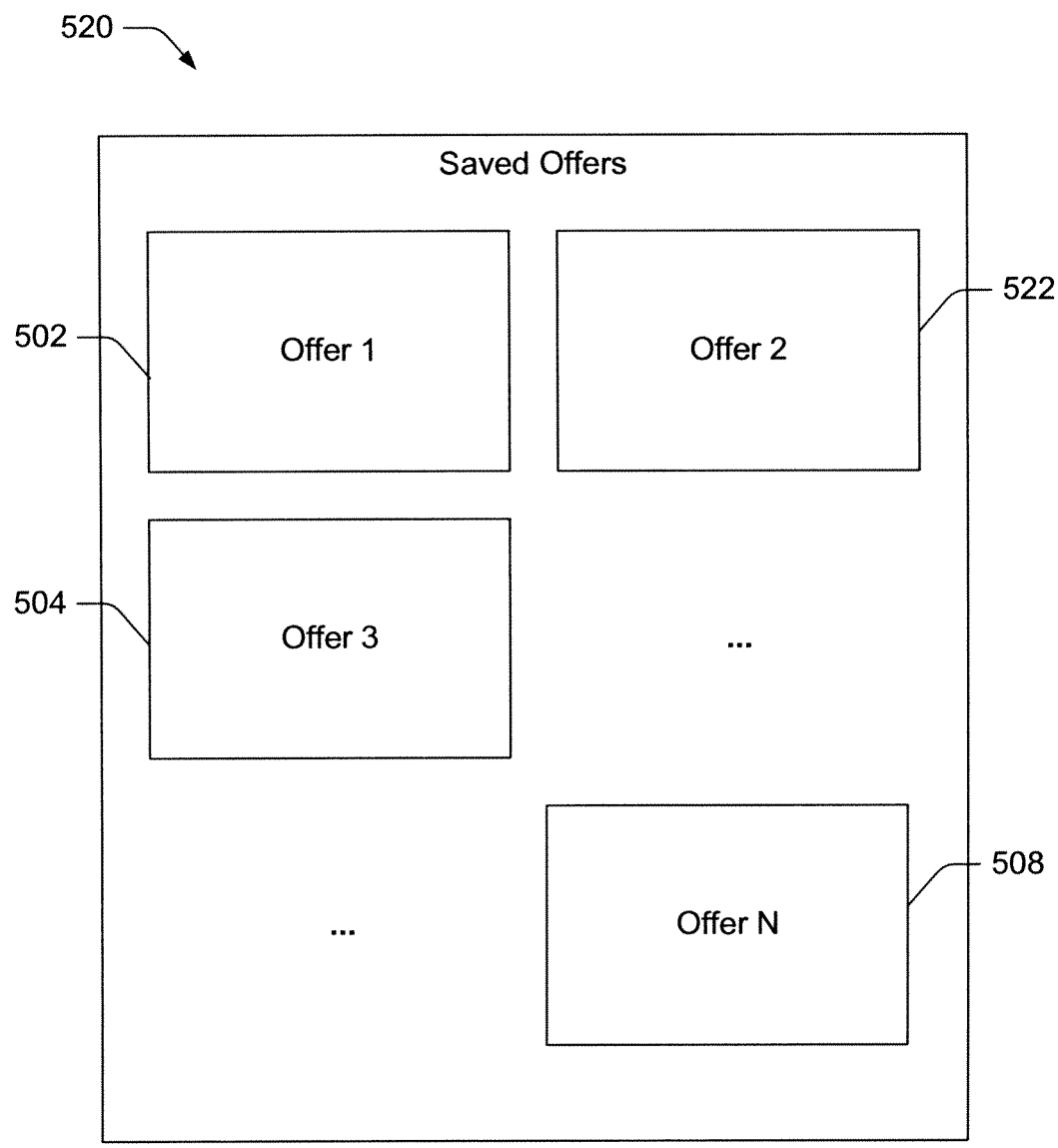
FIG. 16 illustrates an offer library in which are stored all targeted offers presented the customer.

FIG. 16 illustrates an offer library 520 in which are stored all targeted offers presented the customer. As shown in FIG. 16, all offers are stored, including a first offer 502, a second offer 522, a third offer 504, up to an Nth offer 508 (where N is an integer). In the event that the customer does not review the offer library for some time after logging off the web page on which the offers were presented, the offer library automatically deletes offers upon their respective offer expiration dates. In one embodiment, the customer is notified (e.g., via email, a popup notification, etc.) when a saved offer is about to expire (e.g., within one or two days, one week, one hour, or some other predetermined or selected time period).

In another embodiment, a vendor or other provider of the offer determines or selects the notification time period. In this manner, a vendor can create a variable sense of urgency in the customer for an offer that the customer is believed to be interested in. For instance, if the customer is known to have a car lease that is about to expire, then a vendor presenting an offer for a car lease or loan can specify that the offer expiration notification be provided to the marketer 1-2 days before expiry, creating a sense of urgency in the customer and potentially causing the customer to accept the offer prior to expiry.

Figure 17:
FIG. 17 is a screenshot of a webpage showing several customers and their respective KLI tags.
Figure 18:
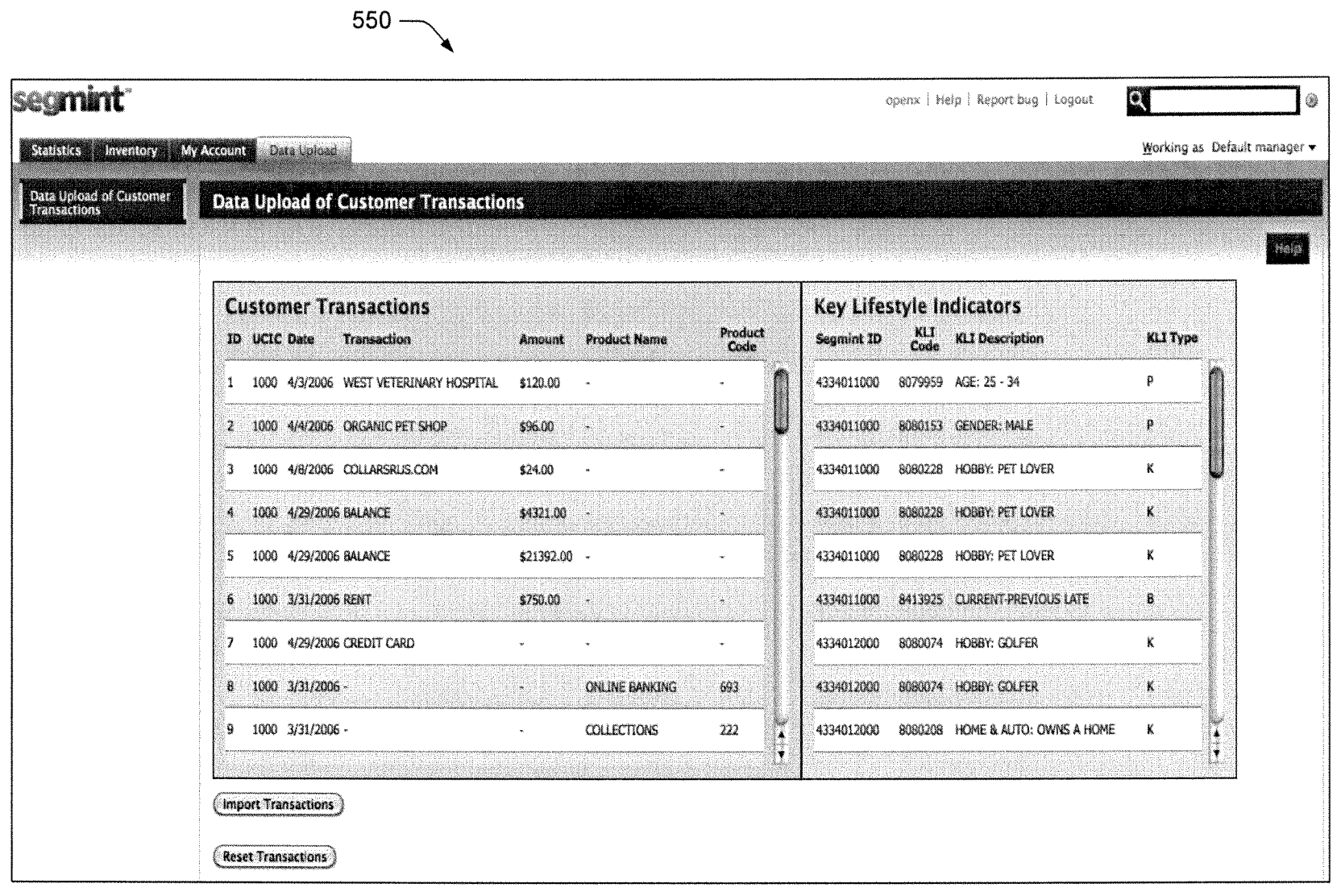

FIG. 17 is a screenshot of a webpage 540 showing several customers and their respective KLI tags. For instance, Customer 1000 has a general KLI tag indicating that he is a pet lover. The "pet lover" KLI tag is a result of several pet-related purchases (FIG. 18). Customer 1000 also has a bank-related KLI tag indicating that he is late on a current or previous month's payment (e.g., for a mortgage, a vehicle, or the like). Additionally, Customer 1000 has person KLI tags that indicate his gender and age range.

Customer 2000 has general KLI tags that indicate that he is a home improver, which are assigned to him based on home improvement type purchases that he has made. Customer 2000's general KLI tags also indicate that he is a wine aficionado and leases a full size luxury car. His bank-related KLI tags indicate that he has a cash back checking account, a money market account that he does not use, and that he has overdrawn his account more than 4 times in the last three months. His personal KLI tags indicate that he is a male between the ages of 45 and 54.

Customer 3000 is a golfer, a pet lover, and owns a home, according to her general KLI tags. Her bank-related KLI tags indicate that she has an interest-bearing checking account, a money market account, and has never overdrawn her account. Her personal KLI tags indicate that she is a female between the ages of 25-34.

FIG. 18 shows a screenshot of a webpage 550 with examples of customer transactions that are analyzed to derive KLI tags for Customer 1000. For instance, three pet-related purchases are shown between April 3 and April 8: one for a veterinary bill, one at a pet store, and one on a pet-related website. Customer 1000 is therefore tagged as a pet lover.

Figure 19:
FIG. 19 illustrates an advertisement or notification that is presented to a user with a late payment KLI tag.

FIG. 19 illustrates an advertisement or notification 560 that is presented to a user with a late payment KLI tag. For instance, customer 1000 is late on a payment, as indicated by the bank KLI in FIG. 17. For this example, the late payment is for an automobile loan. If the payment is less than a predetermined number of days late (e.g., 15 days or so), then the customer is presented with the advertisement 560 of FIG. 19, which provides a subtle reminder to make the payment.

Figure 20:
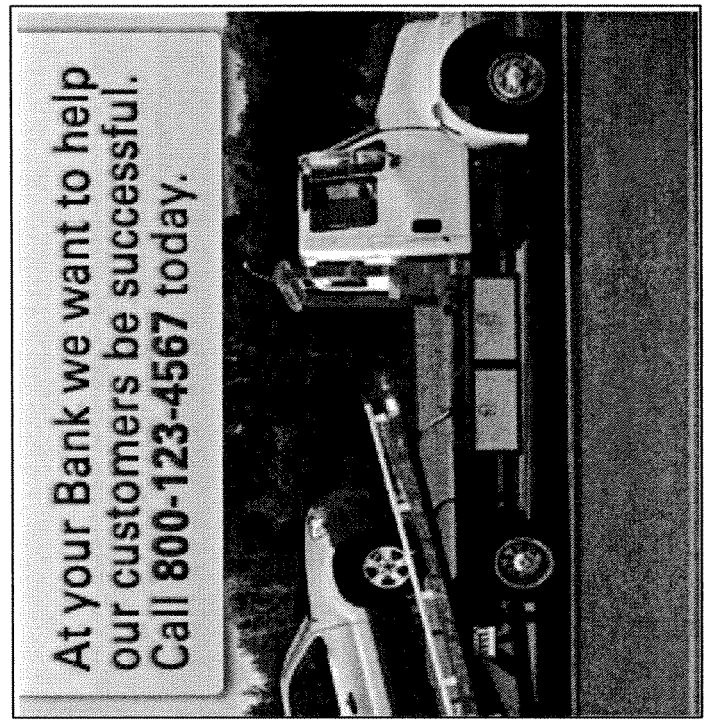
FIG. 20 shows a less subtle advertisement or notification, such as is presented to a customer that is more than the predetermined number of days late with the payment.

FIG. 20 shows a less subtle advertisement or notification 570, such as is presented to a customer that is more than the predetermined number of days late with the payment. For instance, if Customer 1000 is more than 15 days late (e.g., 60 days late), then the advertisement 570 is presented to the customer, and suggests that Customer 1000's car may be repossessed unless payment is made promptly.

Figure 21:
FIGS. 21-23 illustrate a series of progressively more suggestive overdraft protection ("Reg. E") advertisements that are delivered to targeted customers based on a number of times the customer has overdrawn his or her account.
Figure 22:
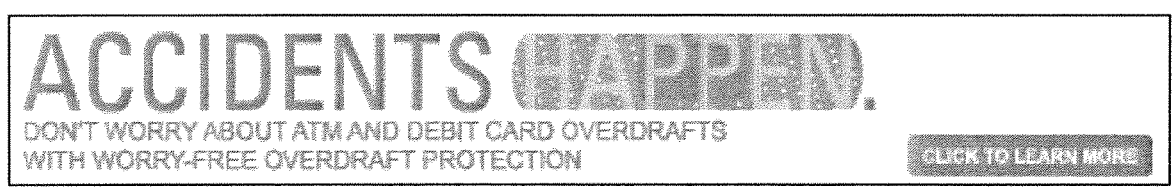
Figure 23:
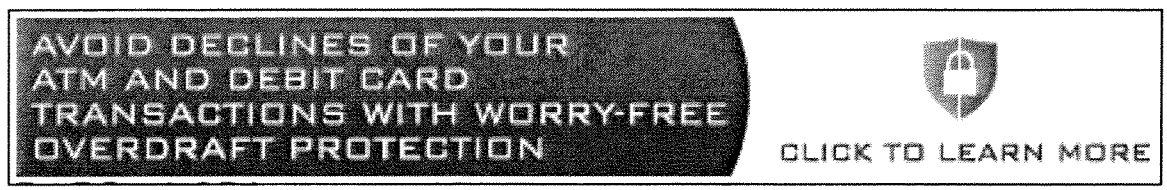

FIGS. 21-23 illustrate a series of progressively more suggestive overdraft protection ("Reg. E") advertisements that are delivered to targeted customers based on a number of times the customer has overdrawn his or her account. For instance, Customer 3000 (FIG. 17) has a Reg E KOLI tag indicating that she has never overdrawn her account. Customer 3000 is therefore a candidate for the advertisement 580 of FIG. 21, which plainly advertises overdraft protection. A customer who has a Reg E KLI tag indicating that the customer has overdrawn his or her account one or more times within a predefined time period (e.g., 1 month, 3 months, etc.), but fewer than a predetermined threshold number of times (e.g., 3, 4, etc.) is presented with a more suggestive advertisement 590 as shown in FIG. 22. Advertisement 590 is therefore targeted to customers with a Reg E KLI tag indicating that the customer has overdrawn his or her account, for example, one to four times in the last three months. For a customer such as customer 2000, who has a Reg E KLI tag indicating that he has overdrawn his account more than four times in the predefined time period, an even more suggestive advertisement is presented. For instance, the advertisement 600 of FIG. 23 points out that overdraft protection can prevent the customer from having his debit card declined at a store counter or online, which is desirable to a chronic over-drafter. In this manner, customers' anonymized profiles are analyzed to detect spending patterns, KLI tags are assigned to the anonymized customers, and targeted advertisements with varied levels of subtlety are presented to the customers as a function of their KLI tags.

It will be appreciated that targeted placement of advertisements having varied levels of subtlety is not limited to advertisements, offers, or notifications relating to payment delinquency (e.g., for house, car, boat, etc., payments) such as described with regard to FIGS. 19 and 20, or to Reg E events (overdrafts), but rather is applicable to any suitable type of spending behavior or pattern for which it may be useful to increase a level of suggestiveness of an advertisement, offer, or notification (e.g., to induce the customer to bring his or her account current. For example, the herein-described systems and methods can track monthly payments for a variety of expenses, and can present a notification to the customer to contact the bank regarding an unusual payment or expense. For instance, a small business may have a certain amount of money or range thereof that is paid out for payroll biweekly. If on a given payday that amount increases (or decreases) significantly (e.g., due to an embezzling employee, a computer glitch, etc.), the bank may contact the customer or notify the customer via a targeted notification to contact the bank. When the customer calls in, the unusual amount(s) can be discussed and or resolved.

In another example, customers who have not opted in to a provision for privacy notifications, mobile banking, or the like are tagged with a "not opted-in" KLI tag and targeted for a notification or advertisement to opt in to the provision. Opt-in notifications may similarly be presented with increasing suggestiveness or urgency (i.e., decreasing subtlety) as a function of a number of times the customer has been previously notified or the amount of time since the customer was first notified, etc.

In yet another example, a customer who is delinquent in a payment by more than a predetermined time period (e.g., 30 days), can be targeted for specific bank notifications (e.g., "your car payment is 30 days past due," or "your term life insurance policy No. 123456789 will be terminated if payment of your premium is not received by date xx/xx/xxxx", etc.). The level of urgency of the message can be increased as a function of the delinquency time period. For instance, at 60 days delinquent, the car payment notification may read "Your automobile may be repossessed in the next 30 days if you do not bring your account current immediately."

In another example, advertisements or notifications from collections departments or agencies are presented to the customers, with variable subtlety as a function of the delinquency time period or dollar amount. For instance, a subtle notification may be presented to the customer in which the customer is asked to call the collection agency to pay the delinquent amount. A more urgent message may be presented after an additional predetermined time period has elapsed with no contact from the customer.

As stated above, the methods described herein may be implemented in a computer program product that may be executed on a computer 378 or computing device. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit, such as the processor 26 or some other suitable processor, and a system bus (not shown) that couples various system components including a system memory, such as the database 22 or some other suitable computer-readable medium, to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer.

By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Systems and methods for delivering targeted advertising have been described with reference to specific embodiments. Modifications and alterations will occur to those upon reading and understanding the preceding detailed description. The invention is not limited to only those embodiments described above. Instead, the invention is intended to cover all modifications and alterations that come within the scope of the appended claims and the equivalents thereof.

The invention claimed is:

1. A method for storing targeted offers in an offer library for a customer during an online web browsing session, including:
    detecting the consumer has logged into a secure web site of a financial institution and providing to the consumer's computer a cookie that includes an ADIC for the customer that corresponds with a UCIC for the consumer;
    detecting the customer has navigated away from the secure web site of the financial institution, and
    presenting a targeted offer to the customer on a web page being visited by the customer, wherein the targeted offer is unsolicited by the customer and selected by an ad provider using the advertisement delivery identification code (ADIC) corresponding to anonymous customer data that describes the customer and is provided to the ad provider from a third party source;
    displaying a menu comprising a plurality of selectable options to the customer when the customer activates the menu, the options representing actions to be performed on the targeted offer;
    receiving customer input relating to selection of an option for storing the targeted offer in the offer library;
    storing the targeted offer to the offer library on a computer-readable medium upon receiving the customer input;
    wherein the targeted offer is targeted to the customer anonymously, using an advertisement delivery identification code (ADIC) that describes the customer;
    wherein the web page is hosted by a financial institution and the customer is a customer of the financial institution;
    wherein the targeted offer is an offer from a third-party marketer, and wherein the advertisement delivery identification code (ADIC) describes the customer without including information by which the personal identity of the customer is determinable by the third-party marketer; and
    wherein the ADIC is associated with a unique customer identification code (UCIC) generated by the financial institution, wherein the UCIC includes customer information that is anonymous to the third-party advertiser but searchable at the request of the third party.

2. The method according to claim 1, wherein the plurality of selectable options in the menu further comprises one or more of:
- an option for ignoring the offer;
- an option for reminding the customer to review the offer before leaving the web page;
- an option for presenting additional offer details to the customer immediately;
- an option for presenting the offer library to the customer; and
- an option for sending the offer to the customer via one or more of:
  - an email;
  - a text message;
  - a multimedia message service (MMS) type message; and
  - a social messaging service.

3. The method according to claim 2, further including presenting the offer library to the customer upon receiving customer input relating to selection of the option for presenting the offer library to the customer.

4. The method according to claim 3, wherein the offer library comprises only offers that the customer has selected to save to the offer library.

5. The method according to claim 1, further including automatically deleting offers from the offer library upon an expiration date of the respective offers.

6. The method according to claim 1, further comprising displaying a designated interaction region, wherein the menu is activated when the customer interacts with the designated interaction region by at least one of:
- clicking on the designated interaction region; and
- hovering a cursor over the designated interaction region.

7. A processor programmed to execute computer-executable instructions stored on a computer-readable medium, for performing the method of claim 1.

8. A system for permitting a customer to store targeted offers to an online offer library, comprising:
- a web page on which is displayed to the customer at least one offer anonymously targeted to the customer as a function of a customer profile associated with the customer and an advertisement delivery identification code (ADIC), thereby becoming a targeted offer; and
- a processor that executes stored instructions for:
  - detecting the consumer has logged into a secure web site of a financial institution and providing to the consumer's computer a cookie that includes an ADIC for the customer that corresponds with a UCIC for the customer,
  - detecting the customer has navigated away from the secure web site of the financial institution, and
  - presenting the targeted offer to the customer on a web page being visited by the customer, wherein the targeted offer is unsolicited by the customer and selected by an ad provider using the advertisement delivery identification code (ADIC) corresponding to anonymous customer data that describes the customer and is provided to the ad provider from a third party source;
  - displaying a menu comprising a plurality of selectable options to the customer when the customer activates the menu, the options representing actions to be performed on the targeted offer, and providing a designated interaction region for receiving customer input relating to selection of an option for storing the targeted offer in the offer library; and
  - storing the targeted offer to the offer library on a computer-readable medium upon receiving the customer input on the designated interaction region for the targeted offer;
- wherein the web page is hosted by a financial institution and the customer is a customer of the financial institution;
- wherein the targeted offer is an offer from a third-party marketer, and wherein the advertisement delivery identification code (ADIC) describes the customer without including information by which the personal identity of the customer is determinable by the third-party marketer; and
- wherein the ADIC is associated with a unique customer identification code (UCIC) generated by the financial institution, wherein the UCIC includes customer information that is anonymous to the third-party advertiser but searchable at the request of the third party.

9. The system according to claim 8, wherein the plurality of selectable options in the menu further comprises:
- an option for ignoring the offer;
- an option for reminding the customer to review the offer before leaving the web page;
- an option for presenting additional offer details to the customer immediately;
- the option for storing the offer to an offer library;
- an option for displaying the offer library to the customer; and
- an option for sending the offer to the customer via one or more of:
  - an email;
  - a text message;
  - a multimedia message service (MMS) type message; and
  - a social messaging service.

10. The system according to claim 9, wherein the processor further executes stored instructions for:
displaying the offer library to the customer upon selection of the option for displaying the offer library to the customer.

* * * * *